(12) United States Patent
Parker et al.

(10) Patent No.: US 11,104,079 B2
(45) Date of Patent: Aug. 31, 2021

(54) THREE-DIMENSIONAL ARTICLE HAVING PERMANENT PHOSPHOR INDICIA FORMED FROM SACRIFICIAL SUPPORT MATERIAL

(71) Applicant: 3D Systems, Inc., Rock Hill, SC (US)

(72) Inventors: Mark Raymond Parker, Portland, OR (US); Jule W. Thomas, Jr., West Linn, OR (US); Bo Wu, Wilsonville, OR (US)

(73) Assignee: 3D Systems, Inc., Rock Hill, SC (US)

( * ) Notice: Subject to any disclaimer, the term of this patent is extended or adjusted under 35 U.S.C. 154(b) by 265 days.

(21) Appl. No.: 16/440,366

(22) Filed: Jun. 13, 2019

(65) Prior Publication Data

US 2019/0389140 A1 Dec. 26, 2019

Related U.S. Application Data

(60) Provisional application No. 62/688,806, filed on Jun. 22, 2018.

(51) Int. Cl.
*B29C 64/40* (2017.01)
*B29C 64/112* (2017.01)
*B33Y 80/00* (2015.01)
*B33Y 10/00* (2015.01)

(52) U.S. Cl.
CPC ............ *B29C 64/40* (2017.08); *B29C 64/112* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| 6,976,627 | B1 * | 12/2005 | Culp ..................... B33Y 80/00 235/462.01 |
| 9,610,733 | B2 | 4/2017 | Swanson et al. |
| 9,765,226 | B2 | 9/2017 | Dain |
| 9,815,241 | B2 | 11/2017 | Pforte et al. |
| 2009/0153826 | A1 * | 6/2009 | Sewell ................ G03F 7/70466 355/67 |
| 2010/0288194 | A1 * | 11/2010 | Stockwell ............. B29C 64/112 118/313 |

(Continued)

FOREIGN PATENT DOCUMENTS

| WO | 2016115046 | 7/2016 |
| WO | 2018044399 | 3/2018 |

*Primary Examiner* — Cachet I Proctor

(57) ABSTRACT

A method manufacturing a three-dimensional article having readable indicia includes three-dimensionally printing the article and post-processing that following the printing. The three-dimensional printing forms the three-dimensional article in a layer-by-layer manner. The resultant three-dimensional article includes an outer portion of build material defining a plurality of enclosed internal channels, an encapsulated support material containing a phosphor component defining the indicia disposed within the channels, and unencapsulated support material that provides structural support to otherwise unsupported portions of the build material during the three-dimensional printing. The post-processing removes the unencapsulated support material form the build material but leaves the encapsulated build material.

6 Claims, 8 Drawing Sheets

(56) References Cited

U.S. PATENT DOCUMENTS

| | | | | |
|---|---|---|---|---|
| 2015/0001750 A1* | 1/2015 | Kozlak | ................ | B29C 64/135 |
| | | | | 264/40.1 |
| 2015/0190964 A1* | 7/2015 | Okamoto | ............... | B33Y 30/00 |
| | | | | 428/192 |
| 2016/0193791 A1* | 7/2016 | Swanson | ................ | B29C 64/40 |
| | | | | 264/408 |
| 2018/0001545 A1* | 1/2018 | Ruiz | .................... | B29C 64/112 |

* cited by examiner

THREE-DIMENSIONAL ARTICLE HAVING PERMANENT PHOSPHOR INDICIA FORMED FROM SACRIFICIAL SUPPORT MATERIAL

CROSS-REFERENCE TO RELATED APPLICATIONS

This non-provisional patent application claims priority to U.S. Provisional Application Ser. No. 62/688,806, Entitled "THREE-DIMENSIONAL ARTICLE HAVING PERMANENT PHOSPHOR INDICIA FORMED FROM SACRIFICIAL SUPPORT MATERIAL" by Mark Raymond Parker et al., filed on Jun. 22, 2018, incorporated herein by reference under the benefit of U.S.C. 119(e).

FIELD OF THE INVENTION

The present disclosure concerns materials for forming solid three-dimensional articles from the selective deposition of materials from an inkjet printhead. More particularly, the present disclosure concerns a novel method and three-dimensional article having permanent phosphor indicia formed from a sacrificial material.

BACKGROUND

Three-dimensional printing systems are in rapidly increasing use for purposes such as prototyping and manufacturing. One type of 3D printer utilizes an inkjet printhead to selectively deposit a material to manufacture a three-dimensional article. Often times it is desirable to integrate an identifier into a three-dimensional object. One challenge is to provide an identifier that is easy to detect.

SUMMARY

Figure 1:
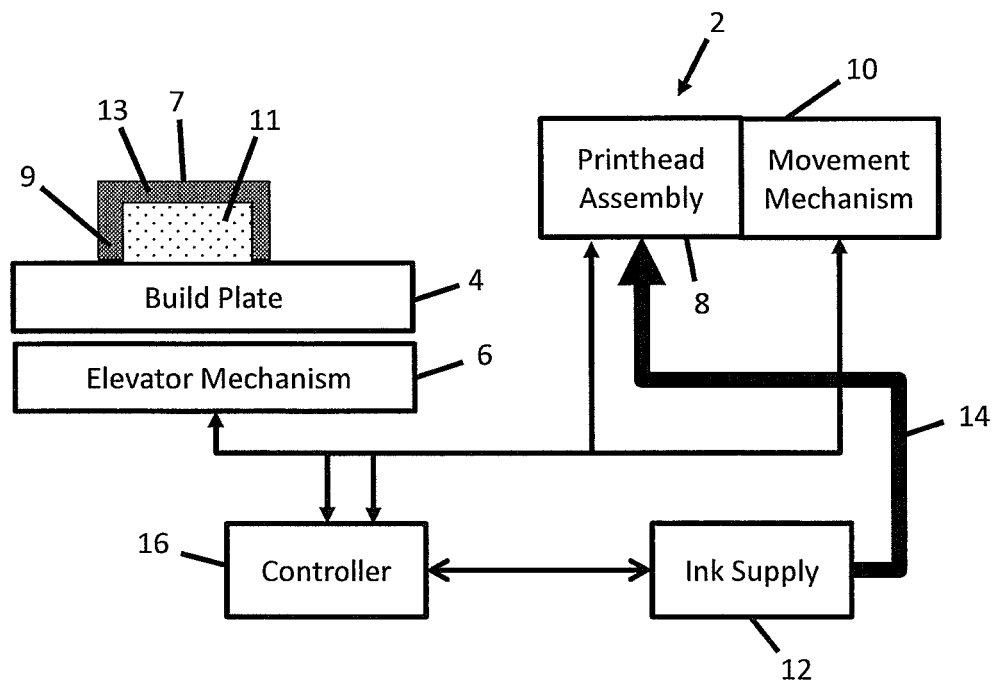
FIG. 1 is a schematic block diagram of an embodiment of a three-dimensional printing system.

In a first aspect of the disclosure, a method manufacturing a three-dimensional article having readable indicia includes three-dimensionally printing the article and post-processing that following the printing. The three-dimensional printing forms the three-dimensional article in a layer-by-layer manner. The resultant three-dimensional article includes an outer portion of build material defining a plurality of enclosed internal channels, an encapsulated support material containing a phosphor component defining the indicia disposed within the channels, and unencapsulated support material that provides structural support to otherwise unsupported portions of the build material during the three-dimensional printing. The post-processing removes the unencapsulated support material form the build material but leaves the encapsulated build material.

In one implementation the support material ink can include 50 to 80 weight percent phase change wax component, 5 to 50 tackifier component, and 0.01 to 5 percent phosphor component, based upon the total weight of the support material. The phase change component can include one or more of a hydrocarbon wax, a fatty alcohol wax, a fatty acid wax, a fatty acid ester wax, an aldehyde wax, an amide wax, and a ketone wax. The phase change component can be present in an amount of 60 to 70 weight percent based on the total weight of the support material. The tackifier component can include one or more of a rosin ester and a rosin alcohol. The tackifier component can be present in an amount of 25 to 45 weight percent based on the total weight of the support material.

In another implementation the phosphor component can have a peak photoluminescence emission wavelength in a range of 450 to 750 nanometers and a photoluminescence quantum yield of 0.10 to 1. The phosphor component can be responsive to an illumination wavelength of 100 to 400 nanometers. The phosphor component can have a peak photoluminescence emission wavelength of 500 to 700 nanometers and have a photoluminescence quantum yield of 0.10 to 1.

In yet another implementation, the post-processing includes applying a solvent to the printed three-dimensional article. The solvent can include one or more of an isopropyl alcohol, polypropylene glycol, ethyl alcohol, ethyl acetate, methyl alcohol, and vegetable oil. The solvent can be applied at an elevated solvent temperature.

In a second aspect of the disclosure, a three dimensional article having readable indicia is manufactured by a layer-by-layer three dimensional printing process followed by a post-process and includes a body and encapsulated support material. The body is formed with a build material including an outer portion defining a plurality of enclosed internal channels. The encapsulated support material contains a phosphor component defining the indicia and is disposed within the channels.

DETAILED DESCRIPTION OF THE PREFERRED EMBODIMENTS

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein.

For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 100" should be considered to include any and all subranges beginning with a minimum value of 1 or more and ending with a maximum value of 100 or less, e.g., 1 to 49, or 33 to 70, or 17 to 100.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other techniques now known in the art or that may be known in the future that use a build material or ink to fabricate three-dimensional objects, parts, or articles.

FIG. 1 is a schematic block diagram of an embodiment of a printing system 2. In describing the printing system 2, mutually orthogonal axes X, Y, and Z are utilized. The axes X and Y will be referred to "lateral" or "horizontal" axes and Z will be described as a "vertical" axis. However, it is to be understood that Z is not necessarily perfectly aligned with a gravitational reference. Also X will refer to a "scan" axis and Y will refer to a "transverse" axis. The direction +Z is referred to as a generally "upward" direction and −Z is a generally "downward" direction.

Printing system 2 includes an elevator mechanism 6 for supporting, aligning, and vertically positioning a build plate 4. The build plate 4 is typically formed from a rigid material such as aluminum or steel and includes an upper surface upon which a three-dimensional (3D) article 7 is to be formed. The rigidity is important so that accurate positional and dimensional tolerances can be achieved. The elevator mechanism 6 is configured to controllably position the build plate 4 along the vertical axis Z.

Printing system 2 includes a printhead assembly 8 that is supported and laterally translated by a movement mechanism 10. Movement mechanism 10 is configured to translate the printhead assembly 8 along scan axis X as printhead assembly 8 selectively deposits drops of ink onto the build plate 6 to form layers of a three-dimensional (3D) article of manufacture. In alternative embodiments, the build plate is mounted to a movement mechanism that laterally translates the build plate, and the printhead assembly is mounted to an elevator mechanism to vertically position the printhead assembly relative to the build plate. Further embodiments of the present invention include alternative mechanisms for moving the printhead assembly relative to the build plate in the X, Y, and Z axes.

Printhead assembly 8 receives ink(s) from an ink supply 12 via an ink path(s) 14. In an exemplary embodiment the ink path 14 is a heated tube that transports a phase change ink from ink supply 12 to the printhead assembly 8. Controller 16 is configured to operate the printing system 2 for printing a three-dimensional (3D) article of manufacture 7.

The method of printing to form the three-dimensional article 7 is a layer-by-layer process. The ink supply 12 includes at least two different inks including a build material ink 9 and a sacrificial support material ink 11. The printing method includes supplying the inks to the printhead assembly 8 including the build material ink 9 and the support material ink 11, printing a layer of the three-dimensional article 7 using the printhead assembly 8, and repeating the supplying and printing until the three-dimensional article 7 is fully formed. Individual layers are nearly planar over axes X and Y. For the illustrated three-dimensional article 7, there is a portion 13 of build material 9 that would be unsupported without the support material 11. After the manufacturing process it is desired that the support material 11 be removed. Thus a post-process is performed to remove the support material 11. Material Ills called "sacrificial support material" 11 because it is generally a temporary or sacrificial material later to be removed from the three-dimensional article 7.

Figure 2:
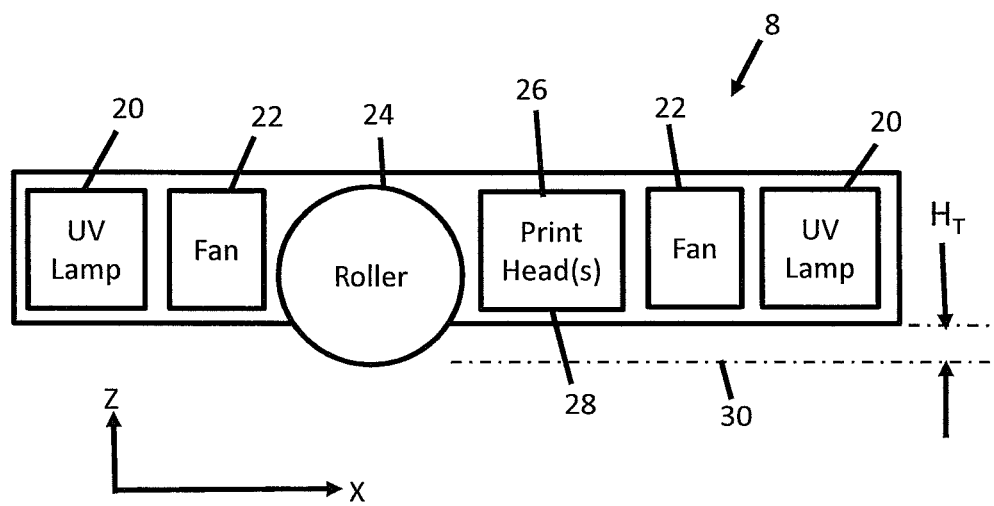
FIG. 2 is a schematic diagram of a printhead assembly utilized in the printing system of FIG. 1.

FIG. 2 schematically depicts an exemplary printhead assembly 8 along the scan axis X. Arranged along X, the printhead assembly 8 includes two UV lamps 20, two fans 22, a planarizer roller 24, and a printhead 26. The printhead 26 has a lower face 28. The planarizer roller 24 is configured to impact and planarize material that extends above a planarizing plane 30. A vertical distance HT extends between the lower face 28 and the planarizing plane 30.

The printhead(s) 26 can include different groups of nozzles to print different inks. If some of these inks are UV curable (curable with ultraviolet light) then the UV lamp 20 can be operated to cure the inks. In some embodiments the printing system 2 will not utilize UV curable inks and then the UV lamps 20 are not required.

In one embodiment the printhead assembly 8 includes one printhead 26 that is configured to eject two different inks including a build material 9 and a support material 11. In another embodiment the printhead assembly 8 includes two different printheads 26—one to eject a build material 9 and one to eject a support material 11. In yet another embodiment, the printing system 2 can include two different printhead assemblies 8—one for ejecting a build material 9 and another for ejecting a support material 11. In further embodiments, the printing system 2 can include additional printheads 26 for ejecting multiple build materials 9 that can vary in terms of color, elastic modulus, fillers, and other properties and aspects.

I. Build Materials

In one aspect, build materials for use with a 3D printing system are described herein. A build material described herein can comprise one or more components that provide mechanical structure to a printed 3D article formed from the build material, as well as a phosphor component. As understood by one of ordinary skill in the art, components that provide mechanical structure can include a variety of materials or chemical species. For instance, in some cases, such components are "phase change" components that undergo a rapid phase change (e.g., fluid to solid) upon deposition onto a substrate, thereby forming a solid voxel of a layer of a printed article. In other instances, structural components of a build material are curable. Curable components, as understood by one of ordinary skill in the art, can be deposited in a shape-unstable or quasi-unstable state and then cured (e.g., polymerized) to form a shape-stable voxel of a layer of a printed 3D article. Such "structural" components of a build material can comprise or form the majority of the build material described herein. Moreover, such "structural" components generally exclude additives such as colorants, stabilizers, and inhibitors.

In general, the types of structural components of a build material described herein are not particularly limited. However, some preferred compositions are particularly described further hereinbelow.

In some preferred embodiments, a build material described herein comprises at least 70 wt. % phase change wax component, optionally up to 30 wt. % additive component, and 0.001-5 wt. % phosphor component, based on the total weight of the build material. In some such cases, the phase change wax component is present in the build material in an amount of at least 85 wt. %, the additive component is present in the build material in an amount of 2-10 wt. %, and the phosphor component is present in the build material in an amount of 0.001-0.5 wt. %, 0.005-0.5 wt. %, or 0.01-0.5 wt. %, based on the total weight of the build material.

In other embodiments, a build material described herein comprises 10-60 wt. % oligomeric curable material, up to 80 wt. % monomeric curable material, and 0.001-0.5 wt. %, 0.005-0.5 wt. %, or 0.01-0.5 wt. % phosphor component, based on the total weight of the build material. In some such instances, the oligomeric curable material is present in the build material in an amount of 10-30 wt. %, the monomeric curable material is present in the build material in an amount of 40-70 wt. %, and the phosphor component is present in the build material in an amount of 0.001-0.5 wt. %, based on the total weight of the build material.

A build material described herein can also include one or more other components, in addition to those described above. For example, in some cases, a build material described herein comprises at least one colorant, at least one photoinitiator, at least one inhibitor, at least one stabilizing agent, or a combination of two or more of the foregoing classes of additional components.

Turning now to specific components of build materials, a build material described herein, in some embodiments, comprises a phase change wax component. Any phase change wax component not inconsistent with the objectives of the present disclosure may be used. Moreover, in some cases, the phase change wax component comprises a plurality or blend of differing waxes. In some instances, the phase change wax component comprises a hydrocarbon wax, a fatty alcohol wax, a fatty acid wax, a fatty acid ester wax, an aldehyde wax, an amide wax, a ketone wax, or a mixture or combination thereof.

A hydrocarbon wax, in some embodiments, comprises a paraffin wax.

Such a paraffin wax can comprise one or more linear (or n-)alkanes, branched (or iso-) alkanes, naphthenes, or alkyl- or naphthene-substituted aromatic hydrocarbons. For example, in some cases, a paraffin wax comprises one or more C9-C60 alkanes. As understood by one of ordinary skill in the art, a "Cn" alkane (or other species) is an alkane (or other species) having "n" carbon atoms. In some instances, a hydrocarbon wax comprises a C9-C40 alkane, a C9-C30 alkane, a C16-C60 alkane, a C16-C40 alkane, a C16-C30 alkane, a C20-C60 alkane, a C20-C50 alkane, or a C20-C40 alkane. Moreover, in some embodiments, a hydrocarbon wax component comprises a plurality of differing species, including a combination of differing species (e.g., linear alkanes, branched alkanes, and/or naphthenic hydrocarbons) mentioned above.

A fatty alcohol wax, in some instances, comprises a fatty alcohol. Any fatty alcohol not inconsistent with the objectives of the present disclosure may be used. In some cases, a fatty alcohol has the general formula $C_nH_{2n+1}OH$, wherein n is an integer from 6 to 36 or from 8 to 28. In some embodiments, for example, a fatty alcohol comprises decanol ($C_{10}H_{21}OH$), dodecanol ($C_{12}H_{25}OH$), tetradecanol ($C_{14}H_{29}OH$), hexadecanol ($C_{16}H_{33}OH$), octadecanol ($C_{18}H_{37}OH$), eicosanol ($C_{20}H_{41}OH$) or docosanol ($C_{22}H_{45}OH$), or a mixture or combination thereof. Further, a fatty alcohol described herein, in some cases, can be a primary alcohol such as stearyl alcohol or behenyl alcohol. Other fatty alcohols may also be used.

Further, an alcohol wax described herein can also comprise a synthetic long chain alcohol or a hydroxyl-terminated hydrophobic polymer, such as a hydroxyl-terminated polyethylene. For example, in some cases, an alcohol wax described herein comprises UNILIN 350, UNILIN 425, UNILIN 550, and/or UNILIN 700.

Moreover, an alcohol wax described herein, in some cases, include an alkoxylated (e.g., ethoxylated) alcohol wax, such as an ethoxylated behenyl alcohol (e.g., NOVEL 22-25 Ethoxylate).

A fatty acid wax, in some embodiments, comprises a fatty carboxylic acid or fatty acid. Any fatty acid not inconsistent with the objectives of the present disclosure may be used. In some cases, a fatty acid has the general formula $C_nH_{2n+1}COOH$, wherein n is an integer from 6 to 36 or from 8 to 28 or from 24 to 49. In some embodiments, for example, a fatty acid comprises lauric acid ($C_{11}H_{23}COOH$), myristic acid ($C_{13}H_{27}COOH$), palmitic acid ($C_{15}H_{31}COOH$), stearic acid ($C_{17}H_{35}COOH$), behenic acid ($C_{21}H_{43}COOH$), or a mixture or combination thereof. A fatty acid wax described herein, in some cases, is a synthetic acid wax such as UNICID 350 or UNICID 550 (commercially available from Baker Hughes). Other fatty acids may also be used.

Further, an acid wax described herein can also comprise a synthetic long chain carboxylic acid or a carboxyl-terminated hydrophobic polymer, such as a carboxyl-terminated polyethylene.

A fatty acid ester wax, in some embodiments, comprises an alkyl alkyl ester, an alkyl aryl ester, an alkyl arylalkyl ester, an alkyl alkylaryl ester, or a combination or mixture of two or more of the foregoing. For example, in some cases, a fatty acid ester wax of a build material described herein comprises an ester having the general formula R—(C=O)—OR', wherein R and R' are each independently an alkyl group described hereinabove for a fatty acid wax or as described hereinbelow for ketone waxes, such as an alkyl group having between 1 and 36 carbon atoms, provided that at least one of R and R' is an alkyl group having at least 4 carbon atoms. In some cases, such an alkyl group is linear. An alkyl group of a fatty acid ester wax described herein can also be branched, cyclic, saturated, unsaturated, substituted, or unsubstituted. An ester wax can also have the general formula R—(C=O)—OAr, RO—(C=O)—Ar, Ar—(C=O)—OAr', Ar—(C=O)—ORAr', ArO—(C=O)—ArR, Ar—(C=O)—OAr'R, ArR—(C=O)—OArR, ArR—(C=O)—OR'Ar, or RAr—(C=O)—OR'Ar, wherein Ar and Ar' are each independently an aryl group described hereinbelow for ketone waxes and R and R' are each independently an alkyl group described above. For example, in some embodiments, Ar and Ar' are each an aryl group having 6 to 36 carbon atoms. One non-limiting example of an ester wax suitable for use in some embodiments described herein is methyl behenate ($CH_3O$—(C=O)—$CH_2(CH_2)_{20}CH_3$). Other ester waxes may also be used.

Moreover, when an ester wax described herein comprises a substituted alkyl, aryl, alkylaryl, or arylalkyl group, one or more substituents of the substituted group, in some cases, can comprise a substituent group described hereinbelow for substituted ketone waxes.

An aldehyde wax described herein, in some embodiments, comprises an alkyl aldehyde, an aryl aldehyde, an arylalkyl aldehyde, an alkylaryl aldehyde, or a combination or mixture of two or more of the foregoing. For example, in some cases, an aldehyde wax of a build material described herein comprises an aldehyde having the general formula R—(C=O)—H, wherein R is an alkyl group described hereinabove for a fatty acid wax or as described hereinbelow for ketone waxes, such as an alkyl group having between 4 and 36 carbon atoms or between 9 and 36 carbon atoms. In some cases, such an alkyl group is linear. An alkyl group of an aldehyde wax described herein can also be branched, cyclic, saturated, unsaturated, substituted, or unsubstituted. An ester wax can also have the general formula R—(C=O)—H, Ar—(C=O)—H, ArO—(C=O)—H, ArR—(C=O)—H, or RAr—(C=O)—H, wherein Ar is an aryl group described hereinbelow for ketone waxes and R is an alkyl group described above. For example, in some embodiments, Ar is an aryl group having 6 to 36 carbon atoms.

Moreover, when an aldehyde wax described herein comprises a substituted alkyl, aryl, alkylaryl, or arylalkyl group, one or more substituents of the substituted group, in some cases, can comprise a substituent group described hereinbelow for substituted ketone waxes.

An amide wax, in some embodiments, comprises an alkyl alkyl amide or bis(amide), an alkyl aryl amide or bis(amide), an aryl aryl amide or bis(amide), an aryl arylalkyl amide or bis(amide), an aryl alkylaryl amide or bis(amide), an arylalkyl arylalkyl amide or bis(amide), an arylalkyl alkylaryl amide or bis(amide), an alkylaryl alkylaryl amide or bis(amide), or a combination or mixture of two or more of the foregoing. For example, in some cases, an amide wax described herein comprises ethylene bis(stearamide) (EBS). In other cases, an amide has the general formula R—(C=O)—NHR', wherein R and R' are each independently an alkyl group described hereinabove, such as an alkyl group having between 1 and 36 carbon atoms, provided that at least one of R and R' is an alkyl group having at least 4 carbon atoms. In some cases, such an alkyl group is linear. An alkyl group of an amide wax described herein can also be branched, cyclic, saturated, unsaturated, substituted, or unsubstituted. An amide wax can also have the general formula R—(C=O)—NR"Ar, RNR"—(C=O)—Ar, Ar—(C=O)—NR"Ar', ArNR"—(C=O)—RAr', Ar—(C=O)—NR"RAr', ArNR"—(C=O)—Ar'R, Ar—(C=O)—NR"Ar'R, ArR—(C=O)—NR"Ar'R, ArR—(C=O)—NR"R'Ar', or RAr—(C=O)—NR"R'Ar', wherein Ar and Ar' are each independently an aryl group described above, R and R' are each independently an alkyl group described above, and R" is hydrogen or an alkyl group described above. For example, in some embodiments, Ar and Ar' are each an aryl group having 6 to 36 carbon atoms. One non-limiting example of an amide wax suitable for use in some embodiments described herein is stearyl stearamide ($CH_3(CH_2)_{17}$—(C=O)—$NH(CH_2)_{17}CH_3$). Other amide waxes may also be used.

A ketone wax, in some cases, comprises an alkyl alkyl ketone, an alkyl aryl ketone, an aryl aryl ketone, an aryl arylalkyl ketone, an aryl alkylaryl ketone, an arylalkyl arylalkyl ketone, an arylalkyl alkylaryl ketone, an alkylaryl alkylaryl ketone, or a combination or mixture of two or more of the foregoing. For example, in some embodiments, a ketone wax described herein comprises an alkyl alkyl ketone having the general formula R—(C=O)—R', wherein R and R' are each independently an alkyl group having between 1 and 36 carbon atoms, provided that at least one of R and R' is an alkyl group having at least 4 carbon atoms. In some cases, such an alkyl group is linear. An alkyl group of a ketone wax described herein can also be branched, cyclic, saturated, unsaturated, substituted, or unsubstituted. Non-limiting examples of alkyl alkyl ketones suitable for use in some embodiments of build materials described herein include n-octyl-n-propyl ketone; n-octyl-n-butyl ketone, n-decyl-n-ethyl ketone, n-undecyl-n-propyl ketone, n-dodecyl-n-ethyl ketone, di-n-hexylketone, di-n-heptylketone, di-n-octyl ketone, di-n-nonyl ketone, di-n-decyl ketone, di-n-undecyl ketone, di-n-tridecyl ketone, di-n-heptadecyl ketone, di-n-octadecyl ketone, and mixtures or combinations thereof. Other alkyl alkyl ketones may also be used.

Further, a ketone wax of described herein can also comprise an alkyl aryl ketone having the general formula R—(C=O)—Ar, wherein R is an alkyl group as described above for an alkyl alkyl ketone, and Ar is an aryl group having 6 to 36 carbon atoms. The aryl group, in some cases, comprises a substituted or unsubstituted phenyl, naphthyl, or anthryl group. Non-limiting examples of alkyl aryl ketones suitable for use in some embodiments of build materials described herein include n-octyl phenyl ketone, n-undecyl phenyl ketone, n-pentadecyl phenyl ketone, n-octadecyl phenyl ketone, and mixtures or combinations thereof. Other alkyl aryl ketones may also be used.

In addition, in some embodiments, a ketone wax described herein comprises an aryl aryl ketone having the general formula Ar—(C=O)—Ar', wherein Ar and Ar' are each independently an aryl group described above for alkyl aryl ketones. Non-limiting examples of aryl aryl ketones suitable for use in some embodiments of build materials described herein include diphenyl acetone, 2-naphthyl phenyl ketone, and mixtures or combinations thereof. Other aryl aryl ketones may also be used.

Moreover, a ketone wax described herein can also comprise an aryl arylalkyl ketone or an aryl alkylaryl ketone having the general formula Ar—(C=O)—Ar'R or Ar—(C=O)—RAr', wherein R is an alkyl group described hereinabove for an alkyl alkyl ketone, and Ar and Ar' are each independently an aryl group described hereinabove for an aryl aryl ketone. One non-limiting example of an aryl alkylaryl ketone suitable for use in some embodiments of build materials described herein is benzyl phenyl ketone. Other aryl arylalkyl ketones or aryl alkylaryl ketones may also be used.

In addition, in some embodiments, a ketone wax described herein comprises an arylalkyl arylalkyl ketone, an arylalkyl alkylaryl ketone, or an alkylaryl alkylaryl ketone having the general formula RAr—(C=O)—Ar'R, RAr—(C=O)—R'Ar', or ArR—(C=O)—R'Ar', wherein Ar and Ar' are each independently an aryl group described above and R and R' are each independently an alkyl group described above. One non-limiting example of such a ketone is di-n-benzyl ketone. Other such ketones may also be used.

Moreover, when a ketone wax described herein comprises a substituted alkyl, aryl, alkylaryl, or arylalkyl group, one or more substituents of the substituted group, in some cases, can comprise a hydroxy group, amine group, imine group, ammonium group, pyridine group, pyridinium group, ether group, ester group, amide group, carbonyl group, thiocarbonyl group, sulfate group, sulfonate group, sulfide group, sulfoxide group, phosphine group, phosphonium group, phosphate group, mercapto group, nitroso group, sulfone group, acyl group, acid anhydride group, or azide group.

Additional examples of ketone waxes suitable for use in some embodiments of build materials described herein include stearones such as T-1 (Kao Corporation); KLB-766

(C21-(C=O)—C21 ketone) (Kao Corporation); and KLB-770 (C17-(C=O)—C17 ketone) (Kao Corporation), and/or laurones such as LAURONE (Kanto Kagaku Co. Ltd.).

Further, a phase change wax component of a build material described herein can be present in the build material in any amount not inconsistent with the objectives of the present disclosure. In some cases, for instance, the phase change wax component is present in an amount of at least 70 wt. % or at least 85 wt. %, based on the total weight of the build material. In some embodiments, the phase change wax component is present in an amount of 70-99 wt. %, 70-95 wt. %, 70-90 wt. %, 70-85 wt. %, 75-99 wt. %, 75-95 wt. %, 75-90 wt. %, 75-85 wt. %, 80-99 wt. %, 80-95 wt. %, 85-99 wt. %, 85-95 wt. %, or 85-90 wt. %, based on the total weight of the build material.

Turning now to other specific components of build materials described herein, build materials described herein may further comprise one or more oligomeric curable materials and/or one or more monomeric curable materials. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

"Oligomeric" species, which are contained in the oligomeric curable material described herein, are themselves polymers or oligomers and have a relatively high molecular weight or a relatively high viscosity. These species are also capable of undergoing additional polymerization, such as through one or more points of unsaturation described herein. A population of oligomeric species in the oligomeric curable material described herein can have varying molecular structures and/or formulas throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). The weight average molecular weight of an oligomeric curable material described herein can generally be in the range from about 400 to 10,000, from about 600 to 10,000, or from about 500 to 7,000.

In contrast to an "oligomeric" species, "monomeric" species, which are contained in the additional monomeric material described herein, are not themselves a polymer or oligomer, and have a relatively low molecular weight or a relatively low viscosity. "Monomeric" species contained in the additional monomeric curable material can have a consistent or well-defined molecular structure and/or formula throughout the population (such as may be exhibited, for instance, by a specified mass of ethoxylated (4) bisphenol A diacrylate or a specific mass of the above-described curable monomer). Additionally, in some embodiments, an additional monomeric curable material as described herein has a viscosity of 500 centipoise (cP) or less at 25° C., when measured according to ASTM D2983, while an "oligomeric" curable material has a viscosity of 1000 cP or more at 25° C., when measured according to ASTM D2983.

One non-limiting example of a polymerizable moiety of the oligomeric curable material or the additional monomeric curable material described herein is an ethylenically unsaturated moiety, such as a vinyl moiety, allyl moiety, or (meth)acrylate moiety, where the term "(meth)acrylate" includes acrylate or methacrylate or a mixture or combination thereof.

Additionally, the oligomeric curable material and the additional monomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material of a build material described herein comprises a mono(meth)acrylate, a difunctional curable material of a build material described herein comprises a di(meth)acrylate, a trifunctional curable material of a build material described herein comprises a tri(meth)acrylate, a tetrafunctional curable material of a build material described herein comprises a tetra(meth)acrylate, and a pentafunctional curable material of a build material described herein comprises a penta(meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species, i.e., a monomeric species, or a relatively high molecular weight species, i.e., an oligomeric species.

In general, any oligomeric curable material not inconsistent with the objectives of the present disclosure may be used in a build material described herein. In some cases, for instance, an oligomeric curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono(meth)acrylate or polyethylene glycol mono(meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; an aliphatic urethane diacrylate, commercially available from ALLNEX under the trade name EBECRYL 8402; a multifunctional acrylate oligomer, commercially available from DYMAX Corporation under the trade name BR-952; aliphatic polyether urethane acrylate, commercially available from DYMAX Corporation under the trade name BR-371S; and an aliphatic polyether urethane methacrylate, commercially available from DYMAX Corporation under the trade name BR-541 MB. Other commercially available oligomeric curable materials may also be used.

Urethane (meth)acrylates suitable for use in build materials described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

The oligomeric curable material can be present in a build material described herein in any amount not inconsistent with the objectives of the present disclosure. In some cases, the oligomeric curable material, in total, is present in the build material in an amount up to about 80 wt. %, up to about 70 wt. %, up to about 60 wt. %, up to about 50 wt. %, up to about 40 wt. %, up to about 30 wt. %, or up to about 20 wt. %, based on the total weight of the build material. In some instances, a build material described herein comprises about 10-80 wt. % of the oligomeric curable material, based on the total weight of the build material. In some embodiments, a build material comprises about 10-70 wt. %, 10-60 wt. %, 10-50 wt. %, 10-40 wt. %, 10-30 wt. %, 10-20 wt. %, 15-80 wt. %, 15-70 wt. %, 15-40 wt. %, 15-30 wt. %, 20-80 wt. %, 20-70 wt. %, 20-60 wt. %, 20-50 wt. %, 20-40 wt. %, 30-80 wt. %, 30-70 wt. %, 30-60 wt. %, 30-50 wt. %, 40-80 wt. %, 40-70 wt. %, or 40-60 wt. % of the oligomeric curable material, based on the total weight of the build material.

In addition, any monomeric curable materials not inconsistent with the objectives of the present disclosure may be used as the monomeric curable material described herein. In some cases, the monomeric curable material of a build material described herein comprises one or more species of (meth)acrylates, such as one or more monofunctional, difunctional, trifunctional, tetrafunctional (meth)acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S.

A monomeric curable material described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth)acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Additional non-limiting examples of commercially available monomeric curable materials useful as the monomeric curable material in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; a cyclic monofunctional acrylate, commercially available by RAHN USA Corp. under the trade name GENOMER 1120; and dipentaerythritol pentaacrylate, commercially available from SARTOMER under the trade name SR 399 LV. Other commercially available monomeric curable materials may also be used.

The monomeric curable material can be present in a build material described herein in any amount not inconsistent with the objectives of the present disclosure. In some cases, the monomeric curable material, in total, is present in an amount up to about 80 wt. %, up to about 70 wt. %, up to about 60 wt. %, or up to about 50 wt. %, based on the total weight of the build material. In some cases, a build material described herein comprises about 0-80 wt. % monomeric curable material, based on the total weight of the build material. In some embodiments, a build material comprises about 30-80 wt. %, 30-70 wt. %, 30-60 wt. %, 30-50 wt. %, 30-40 wt. %, 40-80 wt. %, 40-70 wt. %, 40-60 wt. %, 50-80 wt. %, or 50-70 wt. % monomeric curable material, based on the total weight of the build material.

Turning to another component of build materials described herein, build materials described herein can further comprise at least one photoinitiator. Any photoinitiator not inconsistent with the objectives of the present disclosure may be used. In some cases, a photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyl-diphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a suitable photoinitiator comprises an α-hydroxyphenyl ketone, benzil dimethyl ketal or 2,4,6-trimethylbenzoyldiphenylphosphine oxide or a mixture thereof.

Another class of photoinitiators that may be included in a build material described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541.

A photoinitiator can be present in a build material described herein in any amount not inconsistent with the objectives of the present disclosure. In some embodiments, a photoinitiator is present in a build material in an amount of up to about 5 wt. %, based on the total weight of the build material. In some cases, a photoinitiator is present in an amount ranging from about 0.1 wt. % to about 5 wt. %.

Additionally, in some embodiments, a build material described herein further comprises one or more photosensitizers. In general, such a sensitizer can be added to a build material to increase the effectiveness of one or more photoinitiators that may also be present. In some cases, a sensitizer comprises isopropylthioxanthone (ITX) or 2-chlorothioxanthone (CTX).

A sensitizer can be present in a build material in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the build material.

Turning to another component of the build material described herein, build materials described herein can also comprise at least one colorant, which can particularly be a non-luminescent colorant. The colorant of a build material described herein can be a particulate colorant, such as a particulate pigment, or a molecular colorant. Any such particulate or molecular colorant not inconsistent with the objectives of the present disclosure may be used. In some cases, for instance, the colorant of a build material comprises an inorganic pigment, such as $TiO_2$ and/or ZnO. In some embodiments, the colorant of a build material comprises a colorant for use in a RGB, sRGB, CMY, CMYK, L*a*b*, or Pantone® colorization scheme. In some instances, one or more colorants of a build material described herein exhibits a white color. In other cases, a colorant exhibits a black color. Moreover, in some cases, a particulate colorant described herein has an average particle size of less than about 5 μm, or less than about 1 μm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in a build material described herein in any amount not inconsistent with the objectives of the present disclosure. In some cases, colorant is present in the build material in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the build material.

Moreover, build materials described herein, in some embodiments, further comprise one or more other additives. In some cases, for example, a build material described herein further comprises one or more polymerization inhibitors and/or stabilizing agents. A polymerization inhibitor can be added to a build material to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in a build material in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in a build material in an amount ranging from about 0.1 wt. % to about 5 wt. %, from about 0.5 wt. % to about 4 wt. %, or from about 1 wt. % to about 3 wt. %, based on the total weight of the build material.

In some embodiments, a build material described herein may contain viscosity modifying agents. Non-limiting examples of viscosity modifying agents include a saturated fatty acid or a combination of saturated fatty acids, or an oil, such as a plant oil. The build materials described herein may comprise up to 5 wt. % up to 3 wt. %, up to 1 wt. %, up to 0.5 wt. %, or up to 0.1 wt. % of a viscosity modifying agent not inconsistent with the object of this invention.

Build materials described herein, in some embodiments, also comprise a further additive, such as one or more polymer additives. A polymer additive can be especially preferred, in some instances, when a phase change wax component is also present in the build material. Any polymer not inconsistent with the objectives of the present disclosure may be used as such an additive. For example, in some cases, such a polymer additive is a hydrophobic polymer, including a hydrophobic polymer that is miscible (at least 80% miscible) with one or more phase change wax components described above. In some embodiments, a polymer additive described herein improves the mechanical strength of a build material described herein in an uncured state. One non-limiting example of a polymer additive that may be used in some build materials described herein is Vybar 103 (available from Baker Hughes).

In some cases, a build material described herein can include a non-curable polymer or oligomer as a polymer additive. Such a "non-curable" polymer or oligomer can exclude or be free from a polymerizable moiety described hereinabove, such as an ethyleneically unsaturated moiety or other photocurable moiety. Of course, it is to be understood that such a "non-curable" polymer or oligomer does not include a polymerizable moiety in the polymer or oligomer backbone (and/or in a pendant group of the polymer or oligomer) after formation of the non-curable polymer or oligomer (as opposed to not including a polymerizable moiety prior to formation of the non-curable polymer or oligomer). Non-limiting examples of non-curable polymers or oligomers described herein include polyolefins such as polyethylene or polypropylene, polydienes, polyamides, polyesters, and polyacrylonitriles. Additionally, in some instances, a non-curable polymer or oligomer comprises a copolymer, such as a polyolefin copolymer (e.g., a polypropylene copolymer, or PPC) or a polydiene-polyacrylonitrile copolymer (e.g., a butadiene-acrylonitrile copolymer).

A polymer additive component of a build material described herein can be present in the build material in any amount not inconsistent with the objectives of the present disclosure. In some cases, for instance, the polymer additive component is present in an amount of up to 30 wt. %, up to 25 wt. %, up to 20 wt. %, up to 15 wt. %, up to 10 wt. %, or up to 5 wt. %. In some instances, the polymer additive component is present in an amount of 1-30 wt. %, 1-25 wt. %, 1-20 wt. %, 1-15 wt. %, 1-10 wt. %, 2-20 wt. %, 2-15 wt. %, 2-12 wt. %, 2-10 wt. %, 5-30 wt. %, 5-25 wt. %, 5-20 wt. %, 5-15 wt. %, 5-10 wt. %, 10-30 wt. %, 10-25 wt. %, 10-20 wt. %, 15-30 wt. %, 15-25 wt. %, 15-20 wt. %, or 20-30 wt. %, based on the total weight of the build material.

A build material described herein also comprises a phosphor component. Any phosphor component not inconsistent with the objectives of the present disclosure may be used in a composition described herein. For example, in some cases, a phosphor component described herein comprises an organic phosphor or luminescent species. A phosphor component described herein can also comprise an inorganic phosphor or luminescent species, instead of, or in addition to, an organic phosphor or luminescent species.

Moreover, a phosphor component described herein, in some embodiments, is fluorescent. As understood by one of ordinary skill in the art, such a "fluorescent" phosphor can exhibit luminescence by emitting a photon from a singlet excited state, as opposed to emitting a photon from a triplet excited state or other high spin multiplicity state. Additionally, a "fluorescent" phosphor can exhibit relatively rapid emission following excitation (or absorption) due to emission through a quantum mechanically "allowed" energy transition. For example, in some cases, absorption and subsequent fluorescent emission can occur in about 10 nanoseconds or less. Alternatively, in other instances, a phosphor component described herein is phosphorescent. As understood by one of ordinary skill in the art, such a "phosphorescent" phosphor can exhibit luminescence by emitting a photon from (or through) a triplet excited state or other higher spin multiplicity state, as opposed to emitting a photon from a singlet excited state. As understood by one of ordinary skill in the art, such phosphorescent emission can be due to intersystem crossing of a charge carrier (e.g., an electron). Further, a "phosphorescent" phosphor can exhibit relatively slow emission following excitation (or absorption), due to emission through a quantum mechanically "forbidden" energy transition. For instance, in some cases, absorption and phosphorescent emission occur on a timescale no shorter than 1-10 milliseconds.

In addition, it is to be understood that a phosphor or luminescent species described above can be photoluminescent, as opposed to being electroluminescent or chemiluminescent. Such a "photoluminescent" species is understood to emit light as a result of absorption of light, as opposed to emitting light as a result of application of an electric current or electric field (as in electroluminescence) or as a result of undergoing a chemical reaction (as in chemiluminescence).

Turning again to particular chemical species or materials that can form or be included in a phosphor component described herein, a phosphor component described herein can comprise, include, or be an organic phosphor. Non-limiting examples of organic phosphors include organic laser dyes and fluorescent proteins. In some cases, a phosphor component described herein comprises one or more of fluorescein; a benzothiazole, a cyanine dye such as indocyanine green (ICG); a Dylight-700 such as Dylite-700-2B; 3,3'-Diethylthiatricarbocyanine iodide (DTTCI); a cypate; a rhodamine dye such as rhodamine 6G or rhodamine B; a coumarin; a luciferin; and a green fluorescent protein (GFP) or red fluorescent protein (RFP). Other organic phosphors may also be used.

In addition, in some cases, a phosphor component described herein comprises, includes, or is an inorganic phosphor. In some embodiments, an inorganic luminescent species that can be used as a phosphor component described herein includes a semiconductor nanocrystal or quantum dot, including a II-VI semiconductor nanocrystal such as ZnS or CdSe or a III-V semiconductor nanocrystal such as InP or InAs. In other instances, an inorganic phosphor comprises a Lanthanide species or Lanthanide complex or compound. Other inorganic phosphors may also be used.

A phosphor component described herein can have any luminescence emission profile not inconsistent with the objectives of the present disclosure. For example, in some embodiments, a phosphor exhibits an emission profile including visible light or centered in the visible region of the electromagnetic spectrum, such as between 430 nm and 750 nm or between 450 nm and 750 nm. Thus, in some instances, the phosphor component of a composition described herein has a peak photoluminescence emission wavelength of 430-750 nm, 450-750 nm, or 500-700 nm. In some cases, a phosphor exhibits an emission profile including infrared (IR) light or centered in the IR region of the electromagnetic spectrum. For example, in some instances, a phosphor described herein exhibits an emission profile centered in the near-IR (NIR, 750 nm-1.4 μm), short-wavelength IR (SWIR, 1.4-3 μm), mid-wavelength IR (MWIR, 3-8 μm), or long-wavelength IR (LWIR, 8-15 μm). Moreover, in some embodiments, a phosphor component of a composition described herein comprises a plurality of differing phosphor species having differing emission profiles. For example, in some cases, a first luminescent species of the phosphor component can emit in the NIR and a second luminescent species of the phosphor component can emit in the visible region of the electromagnetic spectrum.

Additionally, a phosphor component of a composition described herein can have a luminescence (e.g., photoluminescence) quantum yield (QY) and absorption cross-section that permit detection of luminescence from the phosphor component in the composition, including when the phosphor component is present in an amount described herein, and including when the composition is observed with the unaided or "naked" human eye of an average or typical human. In some embodiments, the phosphor component has a photoluminescence (PL) quantum yield of 0.10-1. In some instances, the phosphor component has a PL QY of 0.10-0.9; 0.10-0.8; 0.1-0.7; 0.2-1; 0.2-0.9; 0.2-0.8; 0.3-1; 0.3-0.9; 0.3-0.8; 0.4-1; 0.4-0.9; or 0.5-1. As understood by one of ordinary skill in the art, the PL quantum yield of a luminescent species is a ratio of the number of photons emitted by the species to the number of photons absorbed by the species, such that a QY of 1 (or 100%) corresponds to photoluminescence in which the luminescent species emits one photon for each photon absorbed. Moreover, quantum yield can be measured experimentally in any manner not inconsistent with the objectives of the present disclosure. For instance, quantum yield of a luminescent species can be measured by comparison of the emission of the luminescent species to the emission of a reference species (such as a reference dye) having the same optical density or absorbance at the excitation wavelength used in the measurement.

A phosphor component of a build material described herein can be present in the build material in any amount not inconsistent with the objectives of the present disclosure. In some cases, for instance, the phosphor component is present in an amount of up to 5 wt. %, up to 3 wt. %, up to 1 wt. %, or up to 0.5 wt. %, based on the total weight of the build material. In some instances, the phosphor component is present in an amount of 0.001-5 wt. %, 0.001-3 wt. %, 0.001-1 wt. %, 0.001-0.5 wt. %, 0.001-0.1 wt. %, 0.001-0.01 wt. %, 0.01-5 wt. %, 0.01-3 wt. %, 0.01-1 wt. %, 0.01-0.5 wt. %, 0.01-0.1 wt. %, 0.05-5 wt. %, 0.05-3 wt. %, 0.05-1 wt. %, 0.05-0.5 wt. %, 0.1-5 wt. %, 0.1-3 wt. %, 0.1-1 wt. %, 0.5-5 wt. %, 0.5-3 wt. %, or 0.5-1 wt. %, based on the total weight of the build material.

Build materials described herein can also exhibit a variety of desirable properties. For example, a build material described herein can have any freezing point, melting point, and/or other phase transition temperature not inconsistent with the objectives of the present disclosure. In some embodiments, a build material has a freezing or melting point consistent with temperatures used in some 3D printing systems, including 3D printing systems designed for use with phase changing build materials. In some embodiments, the freezing point of a build material is greater than about 40° C. In some cases, for example, a build material has a freezing point centered at a temperature ranging from about 45° C. to about 55° C. or from about 50° C. to about 80° C. In other instances, a build material has a freezing point below about 40° C. or below about 30° C.

Further, in some embodiments described herein, a build material exhibits a sharp freezing point or other phase transition. In some cases, a build material freezes over a narrow range of temperatures, such as a temperature range of about 1° C. to about 10° C., about 1° C. to about 8° C., or about 1° C. to about 5° C. In some embodiments, a build material having a sharp freezing point freezes over a temperature range of X±2.5° C., where X is the temperature at which the freezing point is centered (e.g., X=65° C.).

In addition, a build material described herein, in some embodiments, is fluid at jetting temperatures encountered in 3D printing systems. Moreover, in some cases, a build material solidifies once deposited on a surface during the fabrication of a three-dimensionally printed article or object. Alternatively, in other embodiments, a build material remains substantially fluid upon deposition on a surface. Solidification of a build material, in some cases, occurs through a phase change of the build material, such as freezing. The phase change, in some embodiments, comprises a liquid to solid phase change or a liquid to semi-solid phase change. In some embodiments, solidification of a build material comprises an increase in viscosity, such as an increase in viscosity from a low viscosity state to a high viscosity state, as described further hereinbelow.

Further, a build material described herein can have a viscosity profile consistent with the requirements and parameters of one or more 3D printing systems. In some embodiments, for instance, a build material described herein has a viscosity ranging from about 8.0 cP to about 19.0 cP, from about 8.0 to about 13.5 cP, or from about 11.0 cP to about 14.0 cP at a temperature of about 65° C. when measured according to ASTM standard D2983. In other instances, a build material described herein has a viscosity ranging from about 8.0 cP to about 14.0 cP, from about 9.5 cP to about 12.5 cP, or from about 10.5 cP to about 12.5 cP at a temperature of about 80° C. In some cases, a build material has a viscosity ranging from about 8.0 cP to about 10.0 cP at a temperature of about 85-87° C.

Further, build materials described herein, in some embodiments, exhibit a combination of one or more desirable features. In some cases, for instance, a build material in the non-cured state has one or more of the following properties:
1. Freezing point between about 30° C. and about 65° C.;
2. Jetting viscosity of about 8 cP to about 16 cP at 70-95° C.; an
3. Thermal stability for at least 3 days at the jetting temperature.

Viscosity can be measured according to ASTM D2983 (e.g., using a Brookfield Model DV-II+ Viscometer). In addition, for reference purposes herein, a thermally stable material exhibits no greater than about a 35 percent change in viscosity over a specified time period (e.g., 3 days) when measured at the specified temperature (e.g., a jetting temperature of 85° C.) at the beginning and at the end of the time period. In some embodiments, the viscosity change is no greater than about 30 percent or no greater than about 20 percent, or between about 10 percent and about 20 percent or between about 25 percent and about 30 percent. Moreover, in some embodiments, the change in viscosity is an increase in viscosity.

Moreover, a build material described herein in a cured state, in some embodiments, can exhibit one or more desired properties. A build material in a cured state, in some cases, comprises a build material that includes a curable material or polymerizable component that has been at least partially polymerized and/or cross-linked. For instance, in some embodiments, a cured build material is at least about 10% polymerized or cross-linked or at least about 30% polymerized or cross-linked. In some cases, a cured build material is at least about 50%, at least about 70%, at least about 80%, or at least about 90% polymerized or cross-linked. In some embodiments, a cured build material is between about 10% and about 99% polymerized or cross-linked. In some cases, when in the cured state, a build material described herein can have one or more of the following properties:
1. Tensile Strength of at least 2,000 psi;
2. Tensile Modulus of at least 100,000 psi;
3. Tensile elongation of at least 9%;
4. Hardness of at least 60 shore D;
5. Impact Strength of at least 0.2 ft-lb/in (Izod notched);
6. Flexural Strength of at least 1,500 psi; and
7. Flexural Modulus of at least 2,500 psi.

Build materials described herein can be produced in any manner not inconsistent with the objectives of the present disclosure. In some embodiments, for instance, a method for the preparation of a build material described herein comprises the steps of mixing the components of the build material, melting the mixture, and filtering the molten mixture. Melting the mixture, in some cases, is carried out at a temperature of about 75° C. or in a range from about 75° C. to about 85° C. In some embodiments, a build material described herein is produced by placing all components of the build material in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system.

II. Support Materials

In another aspect, support materials for use with a 3D printing system are described herein. In general, a support material described herein comprises one or more components that provide mechanical structure to removable supporting portions of a printed 3D article formed from the support material, as well as a phosphor component. As understood by one of ordinary skill in the art, components that provide mechanical structure can include a variety of materials or chemical species. For instance, in some cases, such components are "phase change" components that undergo a rapid phase change (e.g., fluid to solid) upon deposition onto a substrate. In other instances, structural components of a support material are curable. Curable components, as understood by one of ordinary skill in the art, can be deposited in a shape-unstable or quasi-unstable state and then cured (e.g., polymerized) to form a shape-stable voxel of material. Such "structural" components of a support material can comprise or form the majority of the support material described herein. Moreover, such "structural" components generally exclude additives such as colorants, stabilizers, and inhibitors.

In general, the types of structural components of a support material described herein are not particularly limited. However, some preferred compositions are particularly described further hereinbelow.

For instance, in some preferred embodiments, a support material described herein comprises 50-80 wt. % phase change wax component, 5-50 wt. % tackifier component, and 0.001-5 wt. % phosphor component, based on the total weight of the support material. In some such cases, the phase change wax component comprises a hydrocarbon wax, a fatty alcohol wax, a fatty acid wax, a fatty acid ester wax, an aldehyde wax, an amide wax, a ketone wax, or a mixture or combination thereof. Moreover, in some instances, the phase change wax component is present in the support material in an amount of 60-75 wt. %, based on the total weight of the support material. Moreover, in some embodiments, the tackifier component of a support material described herein comprises a rosin ester, a rosin alcohol, or a mixture or combination thereof. Such a tackifier component, in some cases, is present in the support material in an amount of 25-45 wt. %, based on the total weight of the support material. It is also possible for the tackifier component to be partially replaced by a poly(alkylene oxide) component. Such a poly(alkylene oxide) component, when used, can be present in a support material in an amount of up to 30 wt. % or up to 40 wt. %. In some instances, a poly(alkylene oxide) component is present in an amount of 5-40 wt. %, 5-30 wt. %, 10-40 wt. %, 10-30 wt. %, 15-40 wt. %, 15-30 wt. %, or 20-30 wt. %, based on the total weight of the support material. Further, in some embodiments described herein, the phosphor component of a support material has a peak photoluminescence emission wavelength of 430-750 nm and/or a photoluminescence quantum yield of 0.10-1. In some instances, the phosphor component has a peak photoluminescence emission wavelength of 500-700 nm and a photoluminescence quantum yield of 0.30-1. Additionally, in some cases, the phosphor component is present in the support material in an amount of 0.001-0.5 wt. % or 0.01-0.5 wt. %, based on the total weight of the support material.

Alternatively, in other preferred embodiments, a support material described herein comprises 60-90 wt. % poly(alkylene oxide) component, 10-30 wt. % curable morpholine component, and 0.001-5 wt. % phosphor component, based on the total weight of the support material. In some such instances, the poly(alkylene oxide) component comprises a poly(ethylene oxide), poly(propylene oxide), or a combination thereof. Moreover, in some embodiments, the poly(alkylene oxide) component comprises a plurality of differing poly(aklylene oxide) species having differing average molecular weights, the differing average molecular weights differing by at least a factor of 2. Further, in some cases, the poly(alkylene oxide) component is present in the support material in an amount of 75-85 wt. %, based on the total weight of the support material. In addition, in some embodiments, the curable morpholine component of a support material described herein comprises one or more species having the structure of Formula (I):

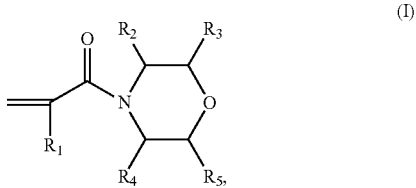

wherein $R_1$ is H or $CH_3$; and $R_2$, $R_3$, $R_4$, and $R_5$ are each independently H, OH, or a C1-C10 hydrocarbyl moiety. Such a curable morpholine component, in some cases, is present in the support material in an amount of 15-25 wt. %, based on the total weight of the support material. Moreover, in some embodiments, the phosphor component has a peak photoluminescence emission wavelength of 430-750 nm and/or a photoluminescence quantum yield of 0.10-1. In some instances, the phosphor component has a peak photoluminescence emission wavelength of 500-700 nm and a photoluminescence quantum yield of 0.30-1. Further, in some embodiments, the phosphor component is present in the support material in an amount of 0.001-0.5 wt. % or 0.01-0.5 wt. %, based on the total weight of the support material.

A support material described herein can also include one or more other components, in addition to those described above. For example, in some cases, a support material described herein comprises at least one colorant, at least one inhibitor, at least one stabilizing agent, or a combination of two or more of the foregoing classes of additional components.

Turning now to specific components of support materials, a support material described herein, in some embodiments, comprises a phase change wax component. A phase change wax component, in some embodiments, is operable to assist or accelerate the solidification of the support material when the support material is cooled to or below the freezing point of the material. In some cases, a phase change wax component has a sharp freezing point or a freezing point over a narrow range of temperatures. In some embodiments, for example, a phase change wax component freezes or solidifies over a temperature range of about 1° C. to about 5° C. or about 1° C. to about 3° C. In some cases, a phase change wax component having a sharp freezing point freezes or solidifies over a temperature range of X±0.5° C., where X is the temperature at which the freezing point is centered (e.g., X=45° C.).

Any phase change wax component not inconsistent with the objectives of the present disclosure may be used in a support material described herein. In some embodiments, a phase change wax component of a support material described herein comprises a hydrocarbon wax, a fatty alcohol wax, a fatty acid wax, a fatty acid ester wax, an aldehyde wax, an amide wax, a ketone wax, or a mixture or combination thereof. More particularly, the hydrocarbon wax, fatty alcohol wax, fatty acid wax, fatty acid ester wax, aldehyde wax, amide wax, or ketone wax can be any hydrocarbon wax, fatty alcohol wax, fatty acid wax, fatty acid ester wax, aldehyde wax, amide wax, or ketone wax described hereinabove in Section I in the context of build materials.

Further, the phase change wax component of a support material described herein can be present in the support material in any amount not inconsistent with the objectives of the present disclosure. In some cases, for instance, the phase change wax component is present in an amount of 50-80 wt. %, 50-70 wt. 5, 60-80 wt. %, or 60-75 wt. %, based on the total weight of the support material.

A support material described herein, in some embodiments, further comprises a tackifier. The inclusion of a "tackifier," in some cases, can increase the adhesiveness of the support material to a printing substrate and/or a build material, as described further hereinbelow. Any tackifier not inconsistent with the objectives of the present disclosure may be used. In some embodiments, for instance, a tackifier comprises a rosin ester, a rosin alcohol, or a mixture or combination thereof. Any rosin ester or rosin alcohol not inconsistent with the objectives of the present disclosure may be used.

In some embodiments, a rosin ester comprises the reaction product of an alcohol with a rosin acid. The alcohol, in some embodiments, comprises methanol, glycerol, diethylene glycol, triethylene glycol, and/or pentaerythritol. The rosin acid, in some cases, comprises one or more of abietic acid, neoabietic acid, dehydroabietic acid, palustric acid, pimaric acid, isopimaric acid, levopimaric acid, and sandaracopimaric acid. Further, in some instances, a rosin ester is at least partially hydrogenated.

A rosin alcohol, in some embodiments, comprises the reaction product of the hydrogenation of one or more rosin acids, including rosin acids described hereinabove. Further, in some cases, a rosin alcohol comprises a primary alcohol, such as hydroabietyl alcohol.

A tackifier can be present in a support material described herein in any amount not inconsistent with the objectives of the present disclosure. In some cases, for instance, a tackifier is present in an amount of 5-50 wt. %, 10-50 wt. %, 10-45 wt. %, 10-40 wt. %, 15-50 wt. %, 15-45 wt. %, 15-40 wt. %, 15-35 wt. %, 20-50 wt. %, 20-45 wt. %, 20-40 wt. %, 25-50 wt. %, 25-45 wt. %, 25-40 wt. %, 25-35 wt. %, 30-50 wt. %, or 30-45 wt. %, based on the total weight of the support material.

Support materials described herein, in some embodiments, also comprise a poly(alkylene oxide) component. Any poly(alkylene oxide) component not inconsistent with the objectives of the present disclosure may be used. For example, in some cases, the poly(alkylene oxide) component comprises a poly(ethylene oxide), a poly(propylene oxide), or a combination thereof. Other poly(alkylene oxide) species may also be used.

Moreover, in some embodiments, the poly(alkylene oxide) component comprises a plurality of differing poly (alkylene oxide) species having differing average molecular weights, the differing average molecular weights differing by at least a factor of 2. For instance, in some cases, the average molecular weights differ by a factor of 1.5 to 5, 1.5 to 4, 1.5 to 3, 1.5 to 2.5, 2 to 5, 2 to 4, or 2 to 3. It is further to be understood that the "average molecular weight" described herein, for polymeric species, is the weight average molecular weight, unless expressly stated otherwise.

The poly(alkylene oxide) component can be present in a support material described herein in any amount not inconsistent with the objectives of the present disclosure. In some cases, for instance, the poly(alkylene oxide) component (in total) is present in an amount of 60-90 wt. %, 60-85 wt. %, 60-80 wt. %, 65-90 wt. %, 65-85 wt. %, 70-90 wt. %, 70-85 wt. %, 70-80 wt. %, 75-90 wt. %, or 75-85 wt. %, based on the total weight of the support material.

Support materials described herein, in some embodiments, comprise a curable morpholine component. A "curable" morpholine component, as described above, comprises a chemical species that includes one or more curable or polymerizable moieties, as well as comprising a morpholine ring, which is typically a substituted morpholine ring. As understood by one ordinary skill in the art, a substituted morpholine ring includes a functional group other than hydrogen bonded to the carbon at the 2, 3, 5, or 6 position of the 6-membered morpholine ring, or bonded to the nitrogen at the 4 position of the 6-membered morpholine ring (where the oxygen atom of the ether portion of the ring is assigned a position of 1, and the nitrogen of the amine portion of the ring is assigned a position of 4). Any curable morpholine component not inconsistent with the objectives of the present disclosure may be used.

In some cases, the curable morpholine component comprises one or more species having the structure of Formula (I) below:

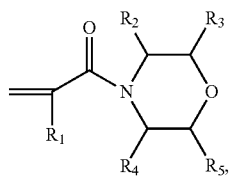

(I)

wherein $R_1$ is H or $CH_3$; and
$R_2$, $R_3$, $R_4$, and $R_5$ are each independently H, OH, or a C1-C10 hydrocarbyl moiety (as understood by one of ordinary skill in the art, a "Cn" hydrocarbyl moiety is a hydrocarbyl moiety that includes exactly "n" carbon atoms). In some such embodiments, $R_1$ is H or $CH_3$; and $R_2$, $R_3$, $R_4$, and $R_5$ are each H. In some cases, a species having the structure of Formula (I) is 4-acryloylmorpholine. In other instances, an acryloyl group is bonded to one or more of the carbon atoms at the 2, 3, 5, and 6 positions of the 6-membered morpholine ring, rather than being bonded to the nitrogen at the 4 position. In such cases, the nitrogen atom of the morpholine ring can have a substituent $R_6$, which may be H or a C1-C10 hydrocarbyl moiety. Other curable morpholine species may also be used.

The curable morpholine component can be present in a support material described herein in any amount not inconsistent with the objectives of the present disclosure. In some cases, for example, the curable morpholine component is present in the support material in an amount of 10-30 wt. %, 10-25 wt. %, 10-20 wt. %, 15-30 wt. %, or 15-25 wt. %, based on the total weight of the support material.

A support material described herein, in some embodiments, further comprises an inhibitor or stabilizing agent. An inhibitor or stabilizing agent, in some cases, can prevent or inhibit the polymerization, oxidation, or other reaction or degradation of one or more components of a support material described herein. Any inhibitor or stabilizing agent not inconsistent with the objectives of the present disclosure may be used. In some instances, an inhibitor or stabilizing agent comprises one or more anti-oxidants. In some cases, for example, an inhibitor or stabilizing agent comprises an aryl compound such as butylated hydroxytoluene (BHT). Other inhibitors or stabilizing agents may also be used.

An inhibitor or stabilizing agent can be present in a support material described herein in any amount not inconsistent with the objectives of the present disclosure. In some embodiments, an inhibitor or stabilizing agent is present in a support material in an amount up to about 10% by weight or up to about 5% by weight, based on the total weight of the support material. In some cases, an inhibitor or stabilizing agent is present in a support material in an amount ranging from about 0.1% by weight to about 10% by weight, from about 0.1% by weight to about 5% by weight, or from about 0.5% by weight to about 4% by weight, based on the total weight of the support material.

In some cases, a support material can also comprise a photoinitiator, including a photoinitiator described above in Section I, and including in a weight percent described hereinabove in Section I.

Support materials described herein also comprise a phosphor component. Any phosphor component not inconsistent with the objectives of the present disclosure may be used in a support material described herein. It is to be understood, for example, that the phosphor component of a support material described herein can be or include any phosphor component described hereinabove in Section I for build materials. For instance, in some cases, a phosphor component described herein comprises a photoluminescent phosphor, such as an organic laser dye. Additionally, in some embodiments, the phosphor component of a support material described herein has a peak photoluminescence emission wavelength of 430-750 nm or 500-700 nm.

Moreover, in some instances, the phosphor component of a support material described herein has a PL QY of 0.10-1; 0.10-0.9; 0.10-0.8; 0.1-0.7; 0.2-1; 0.2-0.9; 0.2-0.8; 0.3-1; 0.3-0.9; 0.3-0.8; 0.4-1; 0.4-0.9; or 0.5-1.

The phosphor component of a support material described herein can be present in the support material in any amount not inconsistent with the objectives of the present disclosure. In some cases, for instance, the phosphor component is present in an amount of up to 5 wt. %, up to 3 wt. %, up to 1 wt. %, or up to 0.5 wt. %, based on the total weight of the support material. In some instances, the phosphor component is present in an amount of 0.001-5 wt. %, 0.001-3 wt. %, 0.001-1 wt. %, 0.001-0.5 wt. %, 0.001-0.1 wt. %, 0.001-0.01 wt. %, 0.01-5 wt. %, 0.01-3 wt. %, 0.01-1 wt. %, 0.01-0.5 wt. %, 0.01-0.1 wt. %, 0.05-5 wt. %, 0.05-3 wt. %, 0.05-1 wt. %, 0.05-0.5 wt. %, 0.1-5 wt. %, 0.1-3 wt. %, 0.1-1 wt. %, 0.5-5 wt. %, 0.5-3 wt. %, or 0.5-1 wt. %, based on the total weight of the support material.

In some embodiments, support materials having a composition described herein can be water dispersible or water soluble. A "water dispersible" support material, in some cases, can be completely or substantially completely dispersed in water within 18 hours or less, within 8 hours or less, within 2 hours or less, within 1 hour or less, within 30 minutes or less, within 15 minutes or less, within 5 minutes or less, within 3 minutes or less, within 2 minutes or less, or within 1 minute or less when immersed in water, with or without agitation of the water. A support material that is "substantially dispersed" in water, in some embodiments, is present in the water as solvated chemical species and/or as colloidal or suspended particles in an amount of at least about 80% by weight, at least about 90% by weight, at least about 95% by weight, or at least about 99% by weight, based on the total weight of the support material. Moreover, in some embodiments, the water is at a temperature of 20-30° C., such as a temperature of 25° C.

Moreover, in some embodiments, a support material described herein is self-emulsifying when contacted with water or a continuous aqueous phase.

Additionally, in some cases, an aqueous dispersion of a support material described herein can be directly disposed of in a wastewater treatment system without further chemical and/or physical processing prior to entry into the wastewater treatment system. In some instances, for example, an aqueous dispersion of a support material described herein can be disposed of in a municipal wastewater treatment system without further chemical and/or physical processing or treatment prior to entry into the municipal wastewater treatment system. Additionally, in some cases, a support material described herein is biodegradable.

Further, support materials described herein, in some embodiments, can have a melting point or freezing point consistent with the temperature parameters of one or more 3D printing systems. In some cases, a support material has a melting point ranging from about 45° C. to about 95° C., from about 45° C. to about 70° C., from about 50° C. to about 65° C., from about 55° C. to about 63° C., or from about 60° C. to about 62° C. Moreover, in some embodiments, a support material described herein has a freezing point ranging from about 45° C. to about 55° C., from about 47° C. to about 52° C., or from about 49° C. to about 51° C.

Further, in some instances, a support material described herein has a viscosity consistent with the requirements and parameters of one or more 3D printing systems. In some cases, for example, a support material described herein has a viscosity ranging from about 9.0 centipoise (cP) to about 14.0 cP at a temperature of about 65° C., when measured according to ASTM standard D2983 (e.g., using a Brookfield Model DV-II+ Viscometer). In some embodiments, a support material has a viscosity ranging from about 9.5 cP to about 12.0 cP or from about 10.0 cP to about 11.0 cP at a temperature of about 65° C. In other cases, a support material described herein has a viscosity ranging from about 10.0 cP to about 19.0 cP, from about 11.0 cP to about 14.0 cP, from about 11.5 cP to about 13.5 cP, or from about 12.0 cP to about 13.0 cP at a temperature of about 80° C.

Support materials described herein can be made in any manner not inconsistent with the objectives of the present disclosure. In some cases, for instance, a method for the preparation of a support material described herein comprises the steps of mixing the components of the support material, melting the mixture, and filtering the molten mixture. Melting the mixture, in some embodiments, is carried out at a temperature of about 55° C. or in a range from about 40° C. to about 110° C. In some embodiments, a support material described herein is produced by placing all components of the support material in a reaction vessel and heating the resulting mixture to a temperature ranging from about 40° C. to about 110° C. with stirring. The heating and stirring are continued until the mixture attains a substantially homogenized molten state. In general, the molten mixture can be filtered while in a flowable state to remove any large undesirable particles that may interfere with jetting.

III. Compositions Comprising 3D Articles

In another aspect, compositions are described herein. In some embodiments, a composition comprises a three-dimensionally printed article comprising a build material and a support material, wherein the build material comprises a build material described hereinabove in Section I, and/or the support material comprises a support material described hereinabove in Section II. Any build material described in Section I may be used in a composition described herein. Similarly, any support material described in Section II may be used in a composition described herein. For example, in some cases, the build material comprises at least 70 wt. % phase change wax component; up to 30 wt. % additive component; and 0.01-5 wt. % phosphor component, based on the total weight of the build material. Additionally, in some embodiments the support material comprises 50-80 wt. % phase change wax component; 5-50 wt. % tackifier component; and 0.01-5 wt. % phosphor component, based on the total weight of the support material. Other combinations of build materials from Section I and support materials from Section II are also possible.

Moreover, in some embodiments in which the composition comprises both a build material described herein in Section I, and also a support material described herein in Section II, the phosphor component of the build material can differ (or have a different emission profile) than the phosphor component of the support material. For instance, in some cases, the build material comprises a first phosphor component having a first peak emission wavelength, and the support material comprises a second phosphor component having a second peak emission wavelength, wherein the first peak emission wavelength and the second peak emission wavelength differ by a sufficient amount to permit spectral resolution of the emission profiles of the build material and support material, either spectroscopically or by unaided eye. In some such embodiments, for example, the first and second peak emission wavelengths differ by at least 50 nm or at least 100 nm. When a composition described herein comprises only a build material described herein in Section I, or only a support material described herein in Section II (as opposed to including both), it is to be understood that the composition can comprise, as an additional or "complementary" component, any other build material or support material not inconsistent with the objectives of the present disclosure. In particular, when a composition described herein includes a build material of Section I, then a support material that may also be present in the composition can be any support material known to one of ordinary skill in the art for use with such a build material, without any particular limitation. Similarly, when a composition described herein includes a support material of Section II, then a build material that may also be present in the composition can be any build material known to one of ordinary skill in the art for use with such a support material, without any particular limitation.

As described further herein, a composition or three-dimensionally printed article described herein, in some embodiments, comprises a plurality of layers of a build material (e.g., a build material of Section I), wherein the layers of the build material are deposited according to data in a computer readable format. Moreover, at least one of the deposited layers of build material is supported by a support material (which can, in some cases, be a support material of Section II). In general, the support material is removable to complete production of the three-dimensionally printed article or object of the composition.

IV. Methods of Printing a 3D Article

In another aspect, methods of printing a 3D article or object are described herein. Methods of printing a 3D article or object described herein can include forming the 3D article from a plurality of layers of a build material described herein in a layer-by-layer manner. Any build material described hereinabove in Section I may be used. For example, in some cases, the build material comprises at least 70 wt. % phase change wax component, optionally up to 30 wt. % additive component, and 0.001-5 wt. % phosphor component, based on the total weight of the build material. Further, the layers of a build material can be deposited according to an image of the 3D article in a computer readable format. In some embodiments, the build material is deposited according to preselected computer aided design (CAD) parameters. Moreover, in some cases, one or more layers of a build material described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include, for example, MJP or SLA 3D printing methods. For example, in some instances, a MJP method of printing a 3D article comprises selectively depositing layers of a build material described herein in a fluid state onto a substrate, such as a build pad of a 3D printing system. In addition, in some embodiments, a method described herein further comprises supporting at least one of the layers of the build material with a support material. Any support material not inconsistent with the objectives of the present disclosure may be used. In some cases, the support material comprises a support material described hereinabove in Section II.

A method described herein can also comprise curing the layers of the build material. For example, in some instances, a method of printing a 3D article described herein further comprises subjecting the build material to electromagnetic radiation of sufficient wavelength and intensity to cure the build material, where curing can comprise polymerizing one or more polymerizable moieties or functional groups of one or more components of the build material. In some cases, a layer of deposited build material is cured prior to the deposition of another or adjacent layer of build material. Additionally, curing one or more layers of deposited build material, in some embodiments, is carried out by exposing the one or more layers to electromagnetic radiation, such as UV light, visible light, or infrared light.

Alternatively, a layer of build material (e.g., a layer of deposited build material) is not cured (or not cured prior to formation of a subsequent layer of build material) but instead simply undergoes a phase transition following formation to solidify the layer.

Further details regarding various methods, including "material deposition" methods (such as MJP) or "vat polymerization" methods (such as SLA), are provided below.

A. Material Deposition Methods

In a material deposition method, one or more layers of a build material described herein are selectively deposited onto a substrate and optionally cured. Curing of the build material may occur after selective deposition of one layer, each layer, several layers, or all layers of the build material.

In some instances, a build material described herein is selectively deposited in a fluid state onto a substrate, such as a build pad of a 3D printing system. Selective deposition may include, for example, depositing the build material according to preselected CAD parameters. For example, in some embodiments, a CAD file drawing corresponding to a desired 3D article to be printed is generated and sliced into a sufficient number of horizontal slices. Then, the build material is selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of build material described herein is heated to the appropriate temperature and jetted through a print head or a plurality of print heads of a suitable ink jet printer to form a layer on a print pad in a print chamber. In some cases, each layer of build material is deposited according to preselected CAD parameters. A suitable print head to deposit the build material, in some embodiments, is a piezoelectric print head. Additional suitable print heads for the deposition of build material and support material described herein are commercially available from a variety of ink jet printing apparatus manufacturers. For example, Xerox, Hewlett Packard, or Ricoh print heads may be used in some instances.

Additionally, in some embodiments, a build material described herein remains substantially fluid upon deposition. Alternatively, in other instances, the build material exhibits a phase change upon deposition and/or solidifies upon deposition. Moreover, in some cases, the temperature of the printing environment can be controlled so that the jetted droplets of build material solidify on contact with the receiving surface. In other embodiments, the jetted droplets of build material do not solidify on contact with the receiving surface, remaining in a substantially fluid state. Additionally, in some instances, after each layer is deposited, the deposited material is planarized and cured with electromagnetic (e.g., UV, visible or infrared light) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted build material described herein prior to curing, in some embodiments, should desirably be sufficient to retain its shape and not be subject to excessive viscous drag from the planarizer.

Moreover, a support material, when used, can be deposited in a manner consistent with that described hereinabove for the build material. The support material, for example, can be deposited according to the preselected CAD parameters such that the support material is adjacent or continuous with one or more layers of the build material. Jetted droplets of the support material, in some embodiments, solidify or freeze on contact with the receiving surface. In some cases, the deposited support material is also subjected to planarization, curing, or planarization and curing. Any support material not inconsistent with the objectives of the present disclosure may be used.

Layered deposition of the build material and support material can be repeated until the 3D article has been formed. In some embodiments, a method of printing a 3D article further comprises removing the support material from the build material, including in a manner described hereinabove (e.g., using an aqueous or non-aqueous solvent).

Curing of the build material, when used, may occur after selective deposition of one layer of build material, of each layer of build material, of several layers of build material, or of all layers of the build material necessary to print the desired 3D article. In some embodiments, a partial curing of the deposited build material is performed after selective deposition of one layer of build material, each layer of build material, several layers of build material, or all layers of the build material necessary to print the desired 3D article. A "partially cured" build material, for reference purposes herein, is one that can undergo further curing. For example, a partially cured build material is up to about 30% polymerized or cross-linked or up to about 50% polymerized or cross-linked. In some embodiments, a partially cured build material is up to about 60%, up to about 70%, up to about 80%, up to about 90%, or up to about 95% polymerized or cross-linked.

In some embodiments, partial curing of the deposited build material can include irradiating the build material with an electromagnetic radiation source or photocuring the build material. Any electromagnetic radiation source not inconsistent with the objectives of the present disclosure may be used, e.g., an electromagnetic radiation source that emits UV, visible or infrared light. For example, in some embodiments, the electromagnetic radiation source can be one that emits light having a wavelength from about 300 nm to about 900 nm, e.g., a Xe arc lamp.

Further, in some embodiments, a post-curing is performed after partially curing is performed. For example, in some cases, post-curing is carried out after selectively depositing all layers of the build material necessary to form a desired 3D article, after partially curing all layers of the build material, or after both of the foregoing steps have been performed. Moreover, in some embodiments, post-curing comprises photocuring. Any electromagnetic radiation source not inconsistent with the objectives of the present disclosure may be used for a post-curing step described herein. For example, in some embodiments, the electromagnetic radiation source can be a light source that has a higher energy, a lower energy, or the same energy as the electromagnetic radiation source used for partial curing. In some cases wherein the electromagnetic radiation source used for post-curing has a higher energy (i.e., a shorter wavelength) than that used for partial curing, an Xe arc lamp can be used for partial curing and a Hg lamp can be used for post-curing.

Additionally, after post-curing, in some cases, the deposited layers of build material are at least about 80% polymerized or cross-linked or at least about 85% polymerized or cross-linked. In some embodiments, the deposited layers of build material are at least about 90%, at least about 95%, at least about 98%, or at least about 99% polymerized or cross-linked. In some instances, the deposited layers of build material are bout 80-100%, about 80-99%, about 80-95%, about 85-100%, about 85-99%, about 85-95%, about 90-100%, or about 90-99% polymerized or cross-linked.

B. Vat Polymerization Methods

It is also possible to form a 3D article from a build material described herein using a vat polymerization method, such as an SLA method. Thus, in some cases, a method of printing a 3D article described herein comprises retaining a build material described herein in a fluid state in a container and selectively applying energy to the build material in the container to solidify at least a portion of a fluid layer of the build material, thereby forming a solidified layer that defines a cross-section of the 3D article. Additionally, a method described herein can further comprise raising or lowering the solidified layer of build material to provide a new or second fluid layer of unsolidified build material at the surface of the fluid build material in the container, followed by again selectively applying energy to the build material in the container to solidify at least a portion of the new or second fluid layer of the build material to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the build material. Moreover, selectively applying energy to the build material in the container can comprise applying electromagnetic radiation having a sufficient energy to cure the build material. In some instances, the electromagnetic radiation has an average wavelength of 300-900 nm, and in other embodiments the electromagnetic radiation has an average wavelength that is less than 300 nm. In some cases, the curing radiation is provided by a computer controlled laser beam. In addition, in some cases, raising or lowering a solidified layer of build material is carried out using an elevator platform disposed in the container of fluid build material. A method described herein can also comprise planarizing a new layer of fluid build material provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to a build material in a container to solidify at least a portion of an nth fluid layer of the build material, thereby forming an nth solidified layer that defines an nth cross-section of the 3D article, raising or lowering the nth solidified layer of build material to provide an (n+1)th layer of unsolidified build material at the surface of the fluid build material in the container, selectively applying energy to the (n+1)th layer of build material in the container to solidify at least a portion of the (n+1)th layer of the build material to form an (n+1)th solidified layer that defines an (n+1)th cross-section of the 3D article, raising or lowering the (n+1)th solidified layer of build material to provide an (n+2)th layer of unsolidified build material at the surface of the fluid build material in the container, and continuing to repeat the foregoing steps to form the 3D article. Further, it is to be understood that one or more steps of a method described herein, such as a step of selectively applying energy to a layer of build material, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from a build material described herein that has a high feature resolution. The "feature resolution" of an article, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by depositing or solidifying a build material described herein can have a feature resolution of about 500 μm or less, about 200 μm or less, about 100 μm or less, or about 50 μm or less, including at elevated temperatures. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

In a vat polymerization method such as described above, the build material may be partially cured as described in Section IVA above. For example, in some embodiments, selectively applying energy to the build material in the container to solidify at least a portion of a fluid layer of the build material may include partially curing at least a portion of a fluid layer of the build material. In other embodiments, partial curing of at least a portion of a fluid layer of the build material may occur after a first layer of the build material is provided and solidified, before or after a second layer of the build material is provided or solidified, or before or after one, several, or all subsequent layers of the build material are provided or solidified.

Additionally, in some embodiments of a vat polymerization method described herein, after partial curing or after the desired 3D article is formed, post-curing as described in Section IVA above may be performed. The desired 3D article may be, for example, an article that corresponds to the design in a CAD file.

Some embodiments described herein are further illustrated in the following non-limiting examples.

EXAMPLES

Build Materials

Build materials according to some embodiments described herein were prepared as follows. Specifically, to prepare various build material compositions, the components of Table I were mixed in a reaction vessel. The amounts in Table I refer to the wt. % of each component of the identified composition, based on the total weight of the composition. For each build material composition, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature. In Table I, "BM" means "Build Material," and "--" means the relevant component is absent from the composition. Table II provides some properties of Build Materials 1-3. The viscosities at 80° C. and 96° C. were measured according to ASTM D2983.

TABLE I

Build Material Compositions.

| | BM 1 | BM 2 | BM 3 |
| --- | --- | --- | --- |
| Phase Change Wax | 96.86 | 99.76 | 99.94 |
| Non-Curable Polymer Additive | 2.56 | — | — |
| Oligomeric Curable Material | — | — | — |
| Monomeric Curable Material | — | — | — |
| Phosphor | 0.05 | 0.11 | 0.05 |
| Stabilizer | 0.51 | — | — |
| Colorant (Non-Phosphor) | 0.02 | 0.13 | 0.01 |
| Photoinitiator | — | — | — |

In Table I above, for Build Material 1, the phase change wax component was a combination of non-polar hydrocarbon wax, paraffin wax, and base wax; the non-curable polymer additive was Vybar 103 (commercially available from Baker Hughes, Inc.); the stabilizing agent was pentaerythritol tetrakis(3-(3,5-di-tert-butyl-4-hydroxyphenyl)propionate)stearyl alcohol; the phosphor was 2,5-thiophenediylbis(5-tert-butyl-1,3-benzoxazole); and the non-phosphor colorant was Keyplast IRS Violet (commercially available from Keystone Aniline Corporation). For Build Material 2, the phase change wax component was a blend of Permulgin 4023 (commercially available from Koster Keunen, Inc.) and hydrogenated hydrocarbon wax resin; the phosphor was 2,5-thiophenediylbis(5-tert-butyl-1,3-benzoxazole), and the non-phosphor colorant was Keyplast Blue (commercially available from Keystone Aniline Corporation). For Build Material 3, the phosphor was 2,5-thiophenediylbis(5-tert-butyl-1,3-benzoxazole), and the non-phosphor colorant was Keyplast Blue.

TABLE II

Build Material Properties.

| | Viscosity at 80° C. (cPs) | Viscosity at 96° C. (cPs) | Peak Melting Point by DSC (° C.) | Peak Freezing Point by DSC (° C.) |
| --- | --- | --- | --- | --- |
| BM 1 | 11.67 | 7.93 | 65.5 | 54.3 |
| BM 2 | 13.1 | 8.67 | 72.5 | 61.1 |
| BM 3 | 14.03 | 9.23 | 70.1 | 60.2 |

In addition to Build Materials 1-3 above, other build materials according to the present invention are provided using the amounts in Table III below (in which each row corresponds to a particular build material composition). The amounts in Table III refer to the wt. % of each component of the relevant composition, based on the total weight of the composition, where it is understood that the total must equal 100 wt. % in a given instance. Additionally, "PI" stands for "photoinitiator."

TABLE III

Build Material Components.

| Phase Change Wax | Non-Curable Additive | Oligomeric Curable Material | Monomeric Curable Material | Phosphor | Stabilizer/Inhibitor | PI |
|---|---|---|---|---|---|---|
| 70-99 | 0-30 | — | — | 0.001-0.5 | 0-1 | — |
| 70-98 | 1-30 | — | — | 0.001-0.5 | 0-1 | — |
| 70-95 | 2-30 | — | — | 0.01-1 | 0-2 | — |
| 80-99 | 0-20 | — | — | 0.01-3 | 0-1.5 | — |
| 85-99 | 2-10 | — | — | 0.001-0.5 | 0-2 | 0-1 |
| — | 0-5 | 10-60 | 10-80 | 0.01-0.5 | 0-2 | 0.1-0.5 |
| — | — | 10-30 | 10-80 | 0.001-1 | 0-2 | 0.1-1.5 |
| — | — | 10-60 | 40-70 | 0.01-3 | 0-2 | 0-2 |
| — | — | 10-30 | 40-70 | 0.001-0.5 | 0-2 | 0-2 |
| — | 0-5 | 10-30 | 40-70 | 0.01-0.5 | 0.01-2 | 0-1.5 |

Support Materials

Support materials according to some embodiments described herein were prepared as follows. Specifically, to prepare various support materials, the components of Table IV were mixed in a reaction vessel. The amounts in Table IV refer to the wt. % of each component of the identified composition, based on the total weight of the composition. For each support material composition, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature. In Table IV, "SM" means "Support Material", and "--" means the relevant component is absent from the composition. Table V provides some properties of Support Materials 1-5. The viscosities at 80° C. and 96° C. were measured according to ASTM D2983. "DSC" in Table V is Differential Scanning Calorimetry.

TABLE IV

Support Material Compositions.

| | SM 1 | SM 2 | SM 3 | SM 4 | SM 5 | SM 6 |
|---|---|---|---|---|---|---|
| Phase Change Wax | 64.27 | 70 | 63.73 | 86.08 | 64.14 | — |
| Tackifier | 35.68 | 28 | 9.10 | 12.30 | 35.61 | — |
| Poly(alkylene oxide) | — | — | 25.49 | — | — | 80.38 |
| Curable Morpholine | — | — | — | — | — | 18.73 |
| Phosphor | 0.05 | 0.05 | 0.04 | 0.04 | 0.25 | 0.03 |
| Stabilizer | — | 1.95 | 1.64 | 1.58 | — | 0.05 |
| Photoinitiator | — | — | — | — | — | 0.81 |

In Table IV above, for Support Material 1 and Support Material 5, the phase change wax component was stearyl alcohol, the tackifier was a glycerol ester of hydrogenated wood rosin, and the phosphor was 2,5-thiophenediylbis(5-tert-butyl-1, 3-benzoxazole). For Support Material 2, the phase change wax component was stearyl alcohol, the tackifier was a hydrogenated rosin ester, the phosphor was 2,5-thiophenediylbis(5-tert-butyl-1, 3-benzoxazole), and the stabilizing agent was BHT. For Support Material 3, the phase change wax component was stearyl alcohol, the tackifier was a hydrogenated rosin ester, the poly(alkylene oxide) was a polyethylene glycol (PEG) having a number average molecular weight of 2050, the phosphor was 2,5-thiophenediylbis(5-tert-butyl-1, 3-benzoxazole), and the stabilizing agent was BHT. For Support Material 4, the phase change wax component was a combination of stearyl alcohol and ethoxylated behenyl alcohol, the tackifier was a hydrogenated rosin ester, the phosphor was a benzothiazole, and the stabilizing agent was BHT. For Support Material 6, the poly(alkylene oxide) component was an approximately equal mixture of PEG 1200 and PEG 425 (where the number refers to the number average molecular weight), the morpholine component was 4-acryloylmorpholine, the phosphor was 2,5-thiophenediylbis(5-tert-butyl-1, 3-benzoxazole), the stabilizing agent was N-nitrosophenylhydroxylamine (aluminium salt), and the photoinitiator was Irgacure 819.

TABLE V

Support Material Properties.

| | Viscosity at 80° C. (cPs) | Viscosity at 96° C. (cPs) | Peak Melting Point by DSC (° C.) | Peak Freezing Point by DSC (° C.) |
|---|---|---|---|---|
| SM 1 | 12.67 | 7.64 | 59.7 | 46.9 |
| SM 2 | 10 | — | 59.7 | 47.5 |
| SM 3 | 10.08 | — | 61.4 | 47.3 |
| SM 4 | 9.78 | — | 61.1 | 46 |
| SM 5 | 13.5 | — | 59.5 | 44.2 |

In addition to Support Materials 1-6 above, other support materials according to the present invention are provided using the amounts in Table VI below (in which each row corresponds to a particular support material composition). The amounts in Table VI refer to the wt. % of each component of the relevant composition, based on the total weight of the composition, where it is understood that the total must equal 100 wt. % in a given instance. Additionally, "PI" stands for "photoinitiator."

TABLE VI

Support Material Components.

| Phase Change Wax | Tackifier | Poly(alkylene oxide) | Morpholine Component | Phosphor | Stabilizer/ Inhibitor | PI |
|---|---|---|---|---|---|---|
| 50-80 | 5-40 | 5-30 | — | 0.001-0.5 | 0-1 | — |
| 50-80 | 5-40 | — | — | 0.01-0.5 | 0-1 | — |
| 60-80 | 10-50 | 0-30 | — | 0.001-1 | 0.01-2 | — |
| 60-75 | 20-50 | 5-30 | — | 0.01-3 | 0.01-1.5 | — |
| 60-75 | 20-45 | 0-30 | 0-10 | 0.01-0.5 | 0-2 | 0-1 |
| 60-75 | 25-45 | 0-10 | 0-10 | 0.001-0.5 | 0-2 | 0.1-0.5 |
| — | — | 60-90 | 10-30 | 0.001-1 | 0-2 | 0.1-1.5 |
| — | 0-10 | 75-85 | 10-30 | 0.01-3 | 0-2 | 0-2 |
| 0-20 | — | 75-85 | 15-25 | 0.01-0.5 | 0-2 | 0-2 |
| 0-10 | — | 60-90 | 15-25 | 0.001-0.5 | 0.01-2 | 0-1.5 |

Figure 3:
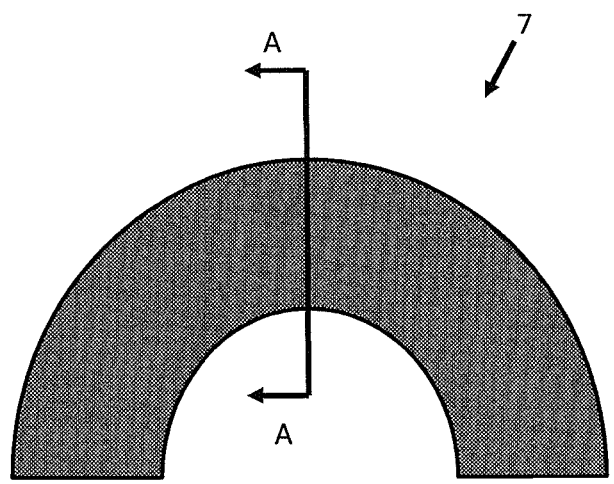
FIG. 3 is an illustration of an embodiment of a three-dimensional article.
Figure 3A:
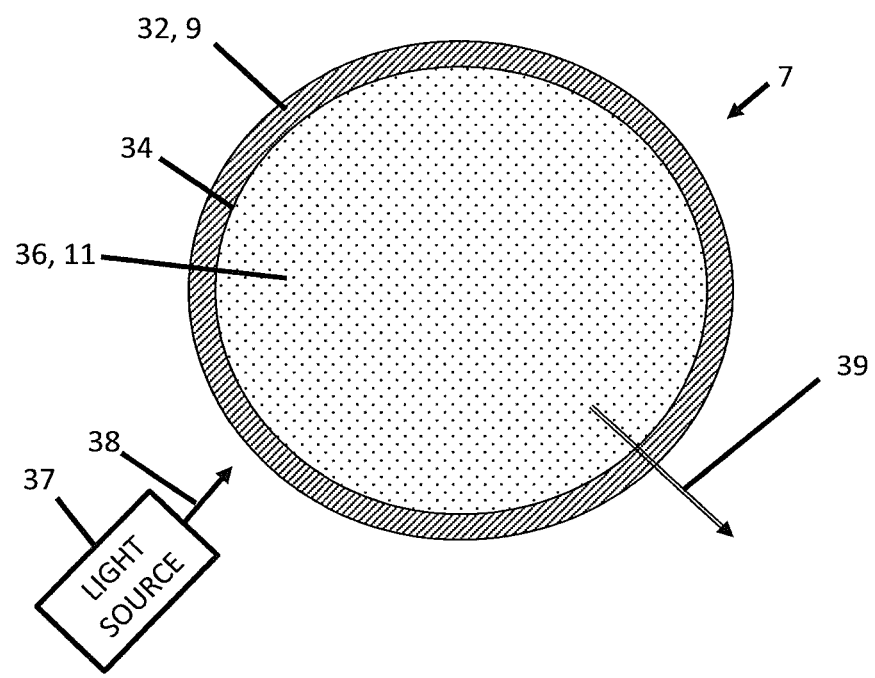
FIG. 3A is a cross-section taken through AA of FIG. 3.

FIG. 3 is an illustration of a portion of an embodiment of a three-dimensional article 7 formed by the three-dimensional printing system 2. The illustrated three-dimensional article 7 has a curved tubular shape and is hollow on the inside. FIG. 3A is a cross-sectional view taken from AA of FIG. 3. As illustrated, the three-dimensional article 7 has an outer shell 32 formed from build material 9. The outer shell 32 has an inside surface 34 that defines a hollow cavity 36 within the three-dimensional article 7. The hollow cavity 36 contains support material 11. The support material 11 is present immediately after a printing process which forms the three-dimensional article 7. The support material 11 may be later removed by a post-process.

Because of the location of the support material 11, it may be impossible to directly observe completeness of the removal post-process by the unaided eye. But because the support material 11 contains a phosphor component it may be observable. According to the illustrated embodiment, a light source 37 is used to apply electromagnetic radiation 38 to the three dimensional article 7. The phosphor component responds to the incoming radiation 38 by emitting radiation 39 that is visible to an unaided eye.

Figure 4:
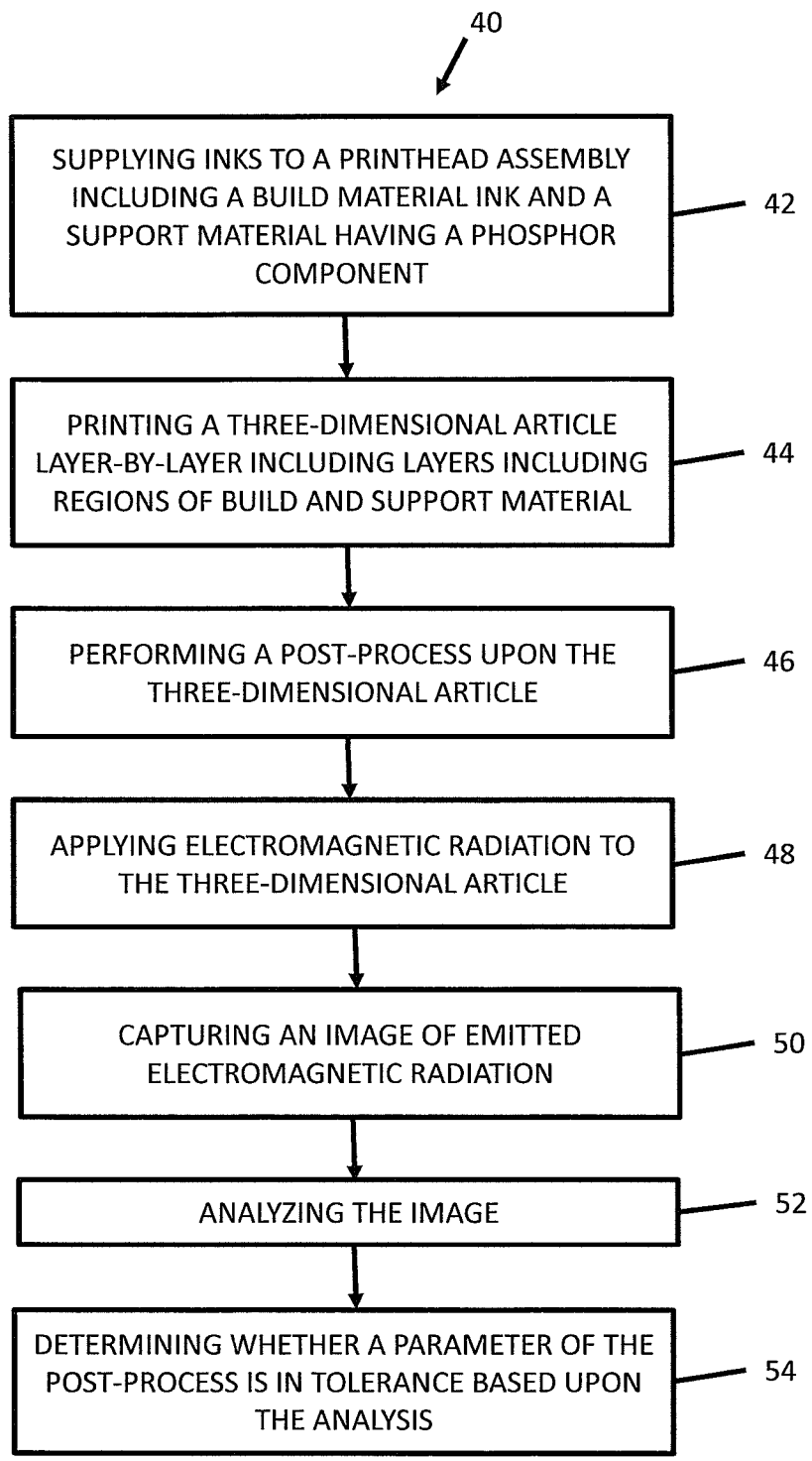
FIG. 4 is a flowchart depicting an embodiment of a manufacturing process for a three-dimensional article and determining whether a post-process parameter is in specification.

FIG. 4 is a flowchart depicting an embodiment of a first method 40 for manufacturing a three-dimensional article utilizing a three-dimensional printing system 2. The three-dimensional article 7 can be a functional product or it can be a test article such as a test coupon for evaluating a post-process.

According to 42, ink supplies 12 supply inks to a printhead assembly 8. The inks include a build material ink 9 and a support material ink 11 having a phosphor component.

According to 44, the printing system 2 prints the three-dimensional article 7 in a layer-by-layer manner. At least some of the printed layers individually include a region of the build material 9 and a region of the support material 11.

According to 46, a post-process is performed upon the three-dimensional article 7. This post-process can include removal of the support material 11. In one implementation, the support material 11 is removed by heating the three-dimensional article 7 whereby the support material 11 melts and drips away from the three-dimensional article 7. In another implementation, the support material 11 is dissolved away with a solvent. In yet another implementation, the support material 11 is removed by a heated solvent. A further implementation includes heating to remove a bulk of the support material 11 followed by a solvent to remove residue.

When a solvent is used to dissolve the support material, the solvent can be a single component or a mixture of co-solvents. The solvent can include one or more of water, isopropyl alcohol (IPA), and other components. The solvent can include one or more of water, isopropyl alcohol (IPA), polypropylene glycol, ethyl alcohol, ethyl acetate, methyl alcohol, and vegetable oil.

According to 48, electromagnetic radiation is applied to the three-dimensional article 7. According to 50, an image of light emitted from the three-dimensional article 7 is captured. The image capture can be performed using a scanner, a camera, or other optical detector that is sensitive to the emitted light.

According to 52, the image is analyzed. Analyzing the image (i.e., image analysis) can include one or more of shape analysis, dimensional analysis, presence analysis, and orientation analysis, to name a few examples.

According to 54, a determination is made as to whether an aspect or parameter of the post-process is acceptable or within a specified tolerance based upon the image analysis. One example is a determination of whether removal of the support material is complete. The criteria can be an emission of captured light that is above a certain energy threshold in step 50.

Figure 5:
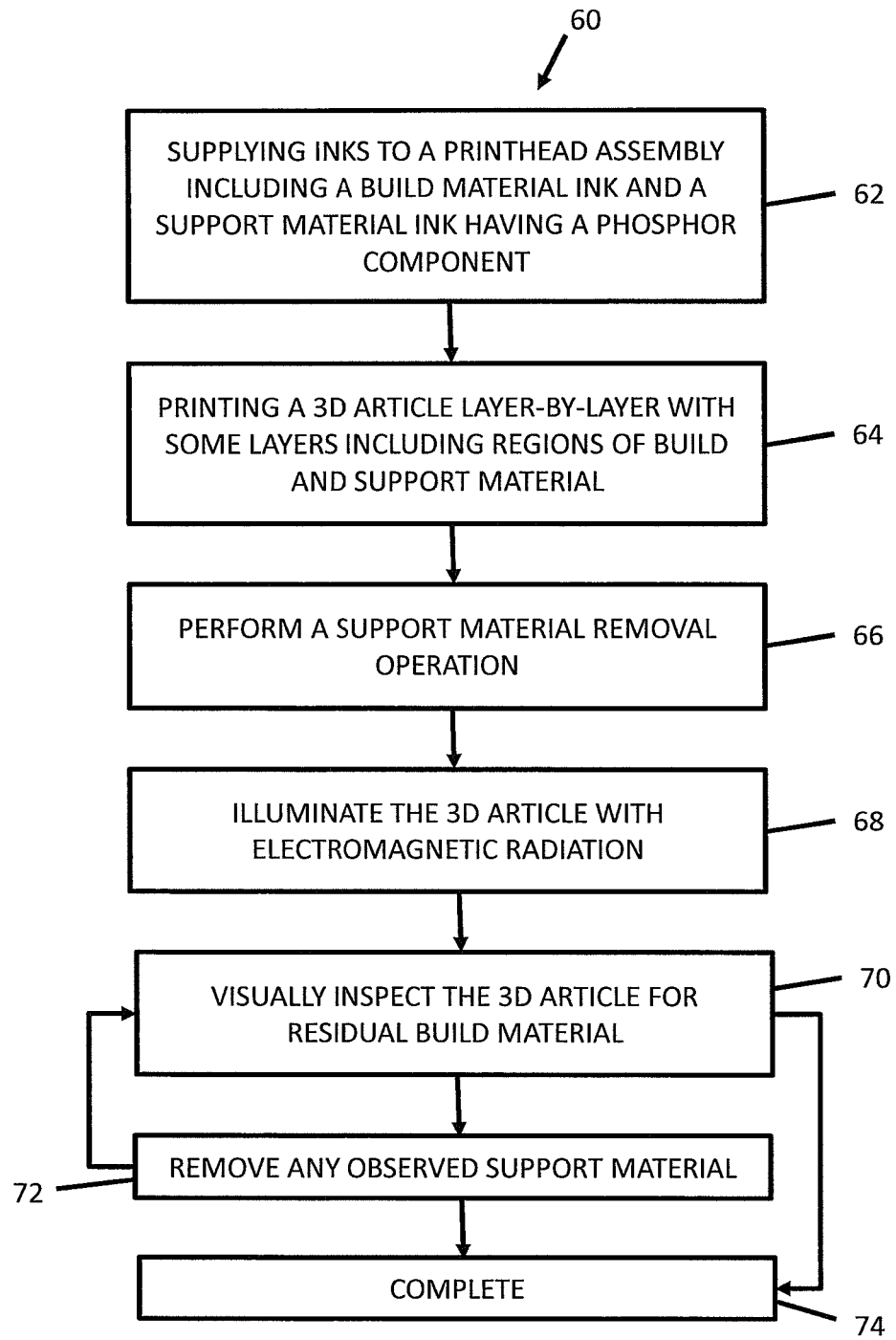
FIG. 5 is a flowchart depicting an embodiment of a manufacturing process for forming a three-dimensional article while verifying completeness of a post process removal of support material.

FIG. 5 is a flowchart depicting a second method 60 for manufacturing a three-dimensional article 7 using a printing system 2. According to 62 ink supplies 12 supply inks to a printhead assembly 8. The inks include a build material ink 9 and a support material ink 11 having a phosphor component.

According to 64 the printing system 2 prints the three-dimensional article 7 in a layer-by-layer manner. The resultant three-dimensional article 7 includes portions containing support material 11.

According to 66, the three-dimensional article is processed to remove the support material 11. In one implementation, the support material is removed by heating the three-dimensional article 7 whereby the support material 11 melts and drips away from the three-dimensional article 7. In another implementation, the support material 11 is dissolved away with a solvent. In yet another implementation, the support material 11 is removed by a heated solvent. In a further implementation, the support material 11 is removed by a combination of heating and solvent application.

According to 68, the three-dimensional article 7 is illuminated with electromagnetic radiation. The electromagnetic radiation can include one or more of ultraviolet light, visible blue light, white light, and ambient light. According to 70, the three-dimensional article 7 is visually inspected. Inspection can take place during and/or after the illumination. Any unremoved support material will emit visible light. If support material 11 is observed, then it is removed according to 72 which can be similar to the removal 66.

When no support material 11 is observed, the manufacturing process 60 is complete according to 74.

Figure 6:
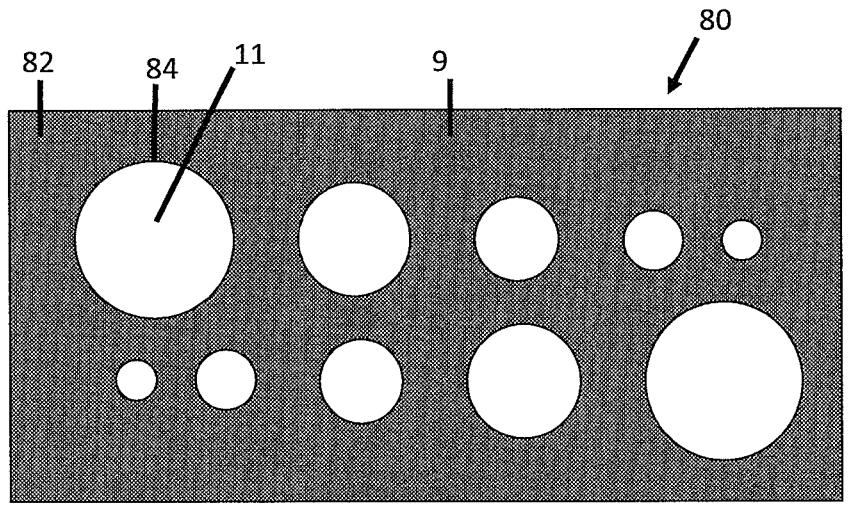
FIG. 6 is an illustration of an embodiment of a test coupon for evaluating a post-process.

FIG. 6 depicts a "test coupon" 80 that is printed as part of a process calibration method for a post-process removal of support material. The illustrated test coupon 80 includes a substrate 82 with a plurality of openings 84. The substrate is formed from build material 9. The openings 84 vary in size from a large opening to a small opening according to a dimension of the opening 84. In the illustrated embodiment, the openings are circular and vary according to a diametrical dimension.

The openings are at least partially filled with support material 11. The support material 11 includes a phosphor component. During a post-process removal of the support material 11, the smaller diameter openings tend to be more difficult to completely clear.

In the illustrative embodiment, the test coupon 80 has cylindrical openings having cylindrical axes that extend along a thickness of the coupon 80. The thickness can have a fixed value or can vary across the coupon in order to provide a varying axial length of the cylindrical openings. The cylindrical openings can either pass completely through the test coupon and/or have a depth that is less than the coupon thickness. The depth of the openings 84 can vary across the substrate.

In other embodiments, the openings 84 can have non-circular shapes such as oval, triangular, square, polygonal, rounded polygonal or irregular. In some embodiments there may be a mixture of different opening shapes and depths. For non-circular openings 84 a "hydraulic diameter" ($D_H$) can be defined as $D_H=4A/P$ in which A is the area of the opening and P is the perimeter of the opening. For non-circular shapes, the hydraulic diameter can be the dimension that varies from one opening 84 to another. For circular shapes, the hydraulic diameter is the same as the diameter.

In yet other embodiments, the openings 84 can vary by shape. For example, a series of openings 84 can all have the same area but vary according to the perimeter shape. As an example, shapes can include circles, polygons, and stars. For a given area, a star shaped opening 84 will take longer to clear than a circular or regular polygon opening.

In a further embodiment, a single slot-shaped opening 84 can be used. The opening 84 varies in depth along the length of the slot. The effectiveness of the support removal process can be gauged according to a length or length percentage of the slot that is cleared.

In a yet further embodiment, the openings 84 are in the form of indicia such as text. The text can have a message such as "NOT COMPLETE." When the text is no longer emitting light (because the phosphor containing support material is removed in post-process) then the post-process would be complete.

Figure 7:
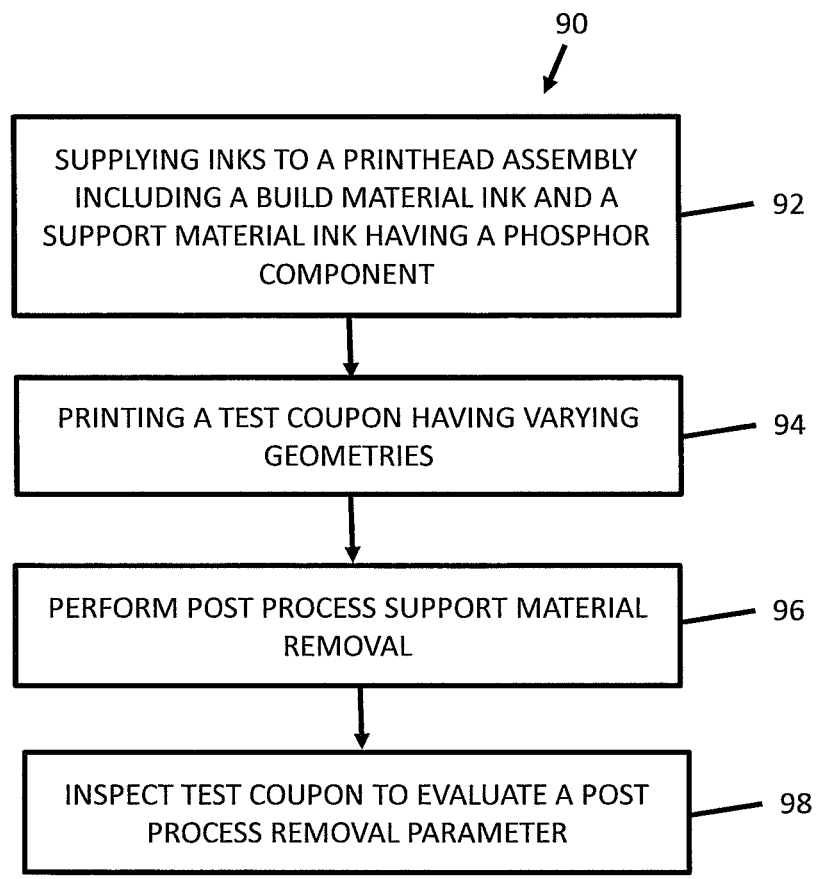
FIG. 7 is a flowchart depicting an embodiment of a process for evaluating a post process removal parameter based upon a test coupon.

FIG. 7 depicts a method 90 of manufacturing and using the coupon 80. The printing system 2 is utilized to concurrently perform steps 92 and 94. According to 92, ink supplies 12 supply inks to a printhead assembly 8. The inks include a build material ink 9 and a support material ink 11. According to 94, the printing system 2 prints test coupon 80 in a layer-by-layer manner.

According to 96, a post-process removal of the support material 11 is performed. According to 98, the coupon 80 is inspected to evaluate the post-process effectiveness. The evaluation can be based upon a smallest or largest dimension opening that is cleared. In one implementation, the evaluation is based upon the smallest diameter or hydraulic diameter that is completely cleared. In another implementation, the evaluation is based upon the deepest opening 84 that is completely cleared.

According to an illustrative embodiment, the support material 86 is a phosphor ink. As part of 98, the coupon can be illuminated with electromagnetic radiation and the inspection occurs either during or after the illumination. Any remaining support material will emit light and facilitate the inspection of step 98.

Figure 8:
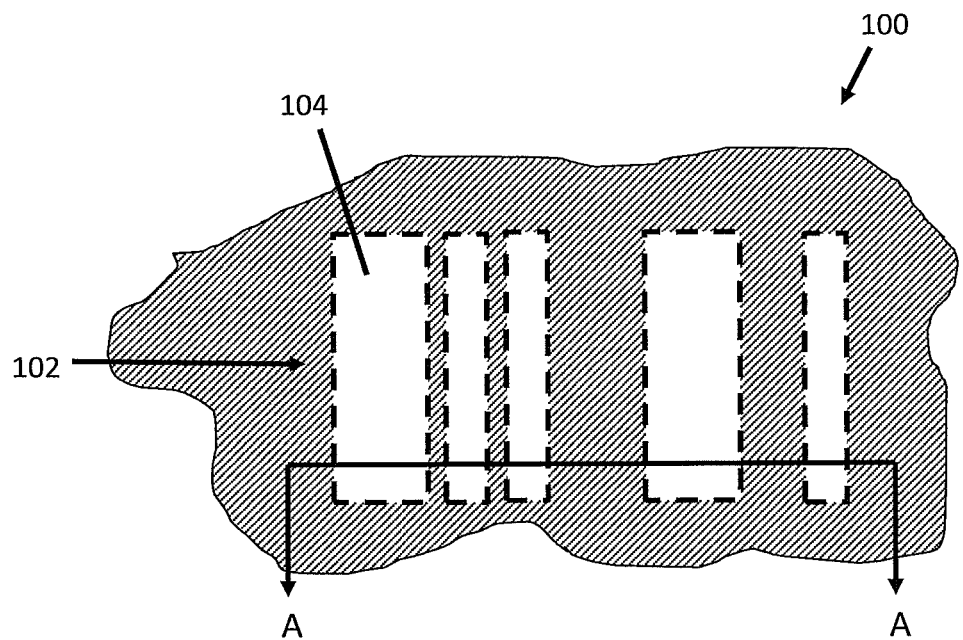
FIG. 8 is an embodiment of a portion of a three-dimensional article having encapsulated indicia.

FIG. 8 depicts a portion 100 of a three-dimensional article 7 having indicia 102 that become visible with a suitable illumination of the article 7. In the illustrated embodiment, the indicia 102 are a plurality of barcode stripes 104 having a varying spacing and width. In various embodiments, the indicia 102 can be machine readable, human readable, or both machine and human readable.

The indicia 102 can be a linear set of barcodes as illustrated or a two dimensional barcode or a QR (quick response) code to name a few examples. In some embodiments, the code can be formed with varying colors.

Figure 8A:
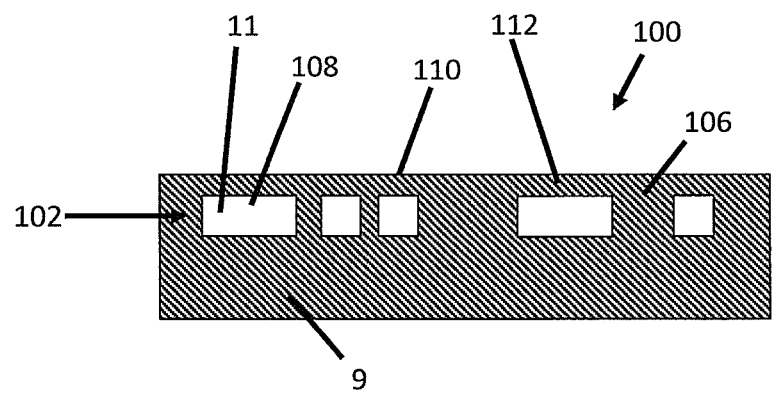
FIG. 8A is a cross-section taken through AA of FIG. 8.

FIG. 8A is a cross-section taken from section AA of FIG. 8. An outer portion 106 of build material 9 defines a plurality of enclosed internal channels 108. The channels 108 are generally filled with support material 11. The channels 108 are generally enclosed thereby encapsulating the support material 11. The support material 11 contains a phosphor component. When the outer portion 106 is illuminated with a suitable electromagnetic radiation, the support material 11 emits light and the indicia 102 become visible along an outer surface 110 of the outer portion 106.

The build material 9 defines an upper cover layer 112 that helps to encapsulate the support material 11 to prevent its removal during post-processing. There are other unencapsulated portions of support material 11 (e.g., see FIGS. 1 and 3A) that support portions of build material 9 during a three-dimensional printing process. The upper cover layer prevents the removal of the encapsulated support material 11 during a post-process that does remove the unencapsulated support material 11. When a light source 37 is used to illuminate the indicia 102 the phosphor component of the encapsulated support material emits light through the cover layer 112 that is visible to a human and/or a light capture device such as a camera or scanner.

Figure 9:
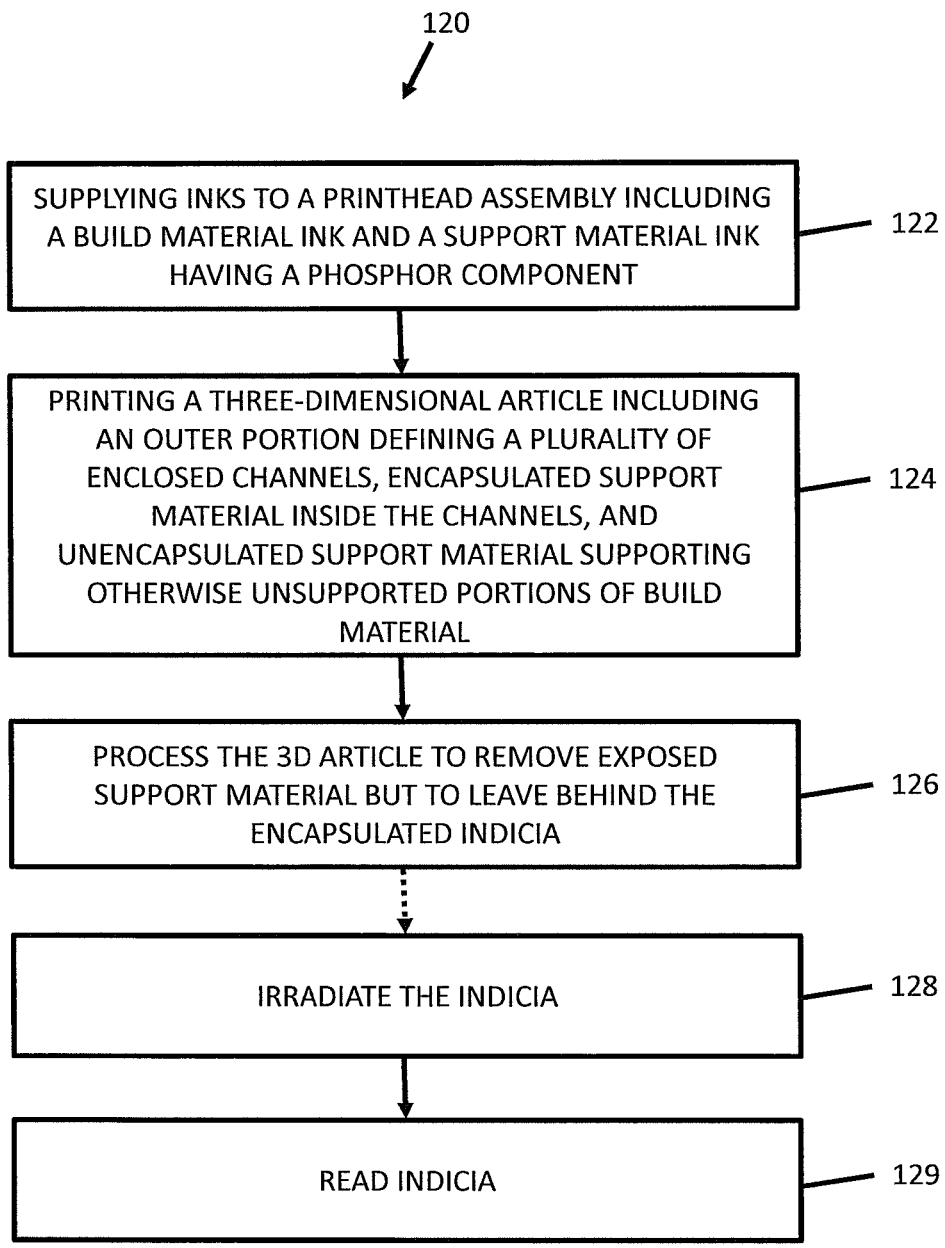
FIG. 9 is a flowchart depicting an embodiment of a process for forming and reading the indicia of FIG. 8.

FIG. 9 is a flowchart that depicts a method 120 for manufacturing a three-dimensional article 7 having indicia 102. The first two operations 122 and 124 are performed concurrently by a three dimensional printing system 2. According to 122, ink supplies 12 supply inks to a printhead assembly 8. The inks include a build material ink 9 and a support material ink 11 having a phosphor component.

According to 124, the three-dimensional printing system 2 prints the three-dimensional article 7 in a layer-by-layer manner. The three-dimensional article 7 includes the outer portion 106 having the encapsulated indicia 102 as discussed with respect to FIGS. 8 and 8A. The three-dimensional article 7 can also have unencapsulated support material 11 to support otherwise unsupported portions 13 of the three-dimensional article as described with respect to FIG. 1.

According to 126, the three-dimensional article 7 is processed to remove the unencapsulated support material 11 but to leave behind the encapsulated support material 11.

At some later time, the indicia 102 are irradiated with electromagnetic radiation according to 128. The indicia 102 are read by human or machine according to 129. Steps 128 and 129 can occur sequentially or simultaneously.

Figure 10:
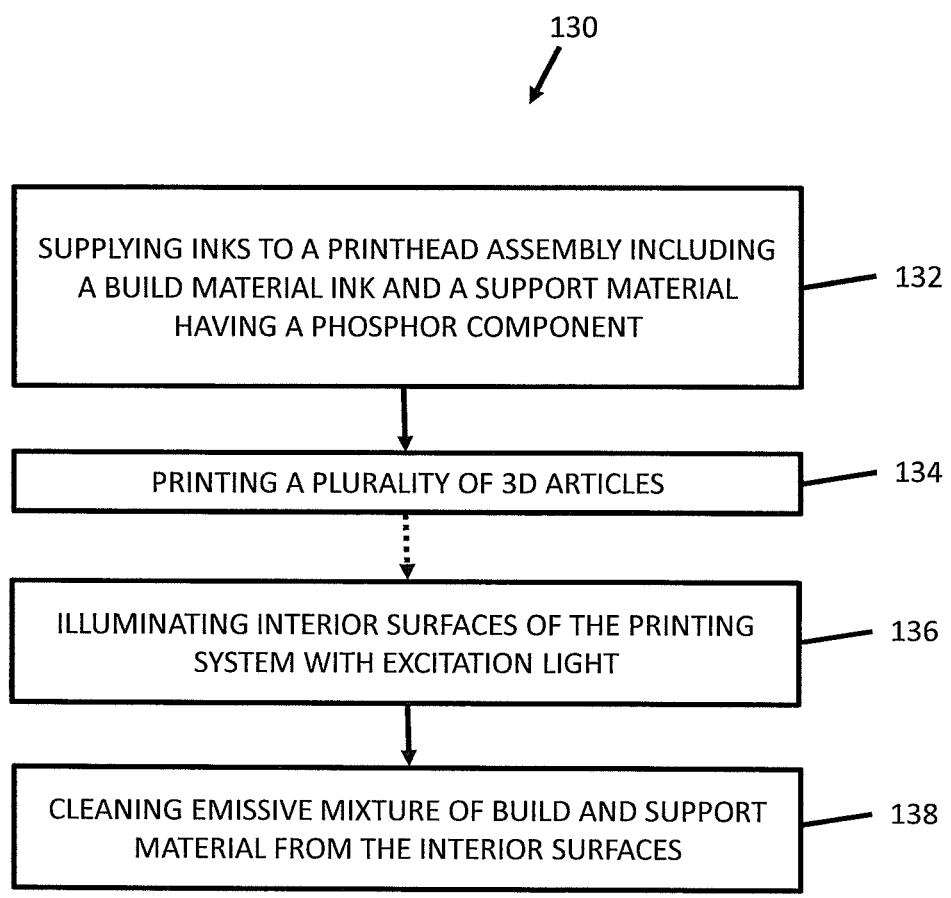
FIG. 10 is a flowchart depicting an embodiment of a process for operating and maintaining a three-dimensional printer that utilizes heated phase change inks.

FIG. 10 is a flowchart that depicts a method 130 of operating and maintaining a three-dimensional printing system 2 and manufacturing a plurality of three-dimensional articles 7. According to 132, ink supplies 12 supply inks to a printhead assembly 8. The inks include a build material ink and a support material ink having a phosphor component during operation. In some embodiments, both the build material and the support material inks individually contain phosphor components. According to 134 a plurality of three-dimensional articles 7 are manufactured by printing system 2.

The inks being used are phase change inks that are heated during operation the printing 134. The inks create a vapor environment that deposits the inks upon inside surfaces of the printing system 2.

According to 136 and 138 the inside surfaces of the printing system 2 are illuminated with electromagnetic radiation. Also according to 136, the inks coating the inside surface are easily identified by their radiative emissions. According to 138, the inks are cleaned from the insides surfaces. This cleaning is facilitated by the radiative emission.

Methods associated with FIGS. 4, 5, 7, 9, and 10 can include illuminating support material 11 with electromagnetic radiation and observing or capturing electromagnetic radiation that is radiated from the support material. In some embodiments, the illumination and observing or capturing happens simultaneously or concurrently. In other embodiments, the observing or capturing occurs after the illumination.

According to one embodiment, the illumination of the support material 11 is performed with ultraviolet (UV) light that can have wavelengths or spectral peaks in a range of 100 to 400 nanometers (nm). The support material responds by radiating light with a wavelength or spectral peak in a visible range of about 450 nanometers to 750 nanometers. The illumination wavelength or spectral peak is less than the radiated wavelength or spectral peak. The UV illumination and the observing or capturing takes place concurrently.

According to another embodiment, the illumination of the support material 11 is performed with blue or violet light that can have wavelengths in the 380 nanometer to 495 nanometer range. The support material responds by radiating light having a wavelength that is greater than the illumination wavelength. The illumination and the observing or capturing takes place concurrently.

According to yet another embodiment, the illumination of the support material 11 is performed with white light or a mixture of wavelengths. The support material responds by radiating light having a shifted or different spectral distribution than the illumination. The observing or capturing takes place after the illumination.

Materials and methods associated with FIGS. 4, 5, 7, 9, and 10 can also vary based upon the composition of the build material ink 9 and support material ink 11 used. In one embodiment, the build material ink 9 and the support material ink 11 are both based primarily upon phase change wax. For such a material combination, the post-process for removing the unencapsulated support material 11 can based upon exposure to a solvent. The solvent preferentially removes the support material 11 rather than the build material 9.

In an alternative embodiment, the build material ink 9 is at least in part based upon an ultraviolet curable ink and has a high heat deflection temperature.

By comparison, the support material 11 is based on a phase change wax. For such a material combination the post-process can be based upon heating in an oven. During the post process, the support material 11 melts and drips off of the build material 9. For some implementations, the support material can be melted and removed with hot water, a steam bath, heated mineral oil, or a specialized cleaning agent.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

What is claimed:

1. A method of manufacturing a three-dimensional article having readable indicia comprising:
   three-dimensionally printing the three-dimensional article in a layer-by-layer manner, the three-dimensional article including:
   an outer portion of build material defining a plurality of enclosed channels;
   encapsulated support material containing a phosphor component defining the readable indicia disposed within the plurality of enclosed channels; and
   unencapsulated support material that provides structural support to otherwise unsupported portions of the build material during the three- dimensional printing; and
   post-processing the three-dimensional article to remove the unencapsulated support material from the build material but leave the encapsulated support material.

2. The method of claim 1 wherein the phosphor component has a peak photoluminescence emission wavelength of 450 to 750 nanometers (nm) and a photoluminescence yield of 0.1 to 1.

3. The method of claim 2 wherein the support material includes 50-80 weight percent of a phase change wax component, 5-50 weight percent tackifier component, and 0.01-5 weight percent phosphor component.

4. The method of claim 3 wherein the phase change wax component includes one or more of a hydrocarbon wax, a fatty alcohol wax, a fatty acid wax, a fatty acid ester wax, an aldehyde wax, an amide wax, and a ketone wax.

5. The method of claim 1 wherein post-processing the three-dimensional article includes applying a solvent to the unencapsulated support material.

6. The method of claim 5 wherein the applied solvent includes one or more of an isopropyl alcohol, polypropylene glycol, ethyl alcohol, ethyl acetate, methyl alcohol, and vegetable oil.

* * * * *